United States Patent
Wang

(10) Patent No.: US 11,131,987 B2
(45) Date of Patent: Sep. 28, 2021

(54) METHOD AND SYSTEM FOR PREVENTING AND DETECTING HAZARDOUSLY MISLEADING INFORMATION ON SAFETY-CRITICAL DISPLAY

(71) Applicant: Xinxin Wang, Naperville, IL (US)

(72) Inventor: Xinxin Wang, Naperville, IL (US)

(*) Notice: Subject to any disclaimer, the term of this patent is extended or adjusted under 35 U.S.C. 154(b) by 345 days.

(21) Appl. No.: 16/276,519

(22) Filed: Feb. 14, 2019

(65) Prior Publication Data
US 2019/0286115 A1 Sep. 19, 2019

Related U.S. Application Data

(60) Provisional application No. 62/643,425, filed on Mar. 15, 2018.

(51) Int. Cl.
| | |
|---|---|
| *G05B 23/02* | (2006.01) |
| *B64D 43/00* | (2006.01) |
| *G06F 9/38* | (2018.01) |
| *G06K 9/62* | (2006.01) |
| *G06T 7/90* | (2017.01) |

(52) U.S. Cl.
CPC ......... *G05B 23/0235* (2013.01); *B64D 43/00* (2013.01); *G06F 9/3877* (2013.01); *G06K 9/6202* (2013.01); *G06T 7/90* (2017.01)

(58) Field of Classification Search
CPC .................................................. G05B 23/0235
See application file for complete search history.

(56) References Cited

U.S. PATENT DOCUMENTS

| | | | |
|---|---|---|---|
| 6,298,286 B1 | 10/2001 | Ying | |
| 6,481,295 B1 * | 11/2002 | Schoch | ............... B30B 15/0094 73/511 |
| 6,693,558 B2 | 2/2004 | Hedrick | |
| 6,791,476 B1 | 9/2004 | Hedrick | |
| 6,977,666 B1 | 12/2005 | Hedrick | |
| 7,012,553 B2 | 3/2006 | Hedrick | |
| 7,659,903 B2 | 2/2010 | Hedrick | |
| 7,882,394 B2 * | 2/2011 | Hosek | ...................... G07C 3/00 714/26 |

(Continued)

OTHER PUBLICATIONS

Gregory Sillens, Eight concerns with graphics processors in safety critical applications, White paper, 2018, Core Avionics & Industrial Inc. 400 N. Tampa St. Suite 2850, Tampa, Florida 33602, US. Available at http://www.coreavi.com/sites/default/files/coreavi_white_paper_-eight_concerns-v2.pdf.

*Primary Examiner* — Jean Paul Cass

(57) ABSTRACT

An object-based integrity verification method for detecting hazardously misleading information contained in an output image of a graphics processing unit comprises steps of: identifying a plurality of safety-critical graphic objects in the output image; assigning each safety-critical graphic object an object ID code; creating an object verification database; rendering a monochrome reference ID code image using object ID code as its color component; verifying the location, shape and color information for each safety-critical graphic object, and tracking the visibility and overlaying property between safety-critical graphic objects using the monochrome reference ID code image; detecting and evaluating failure condition; and annunciating the failure condition with proper warning level and appropriate corrective action.

20 Claims, 12 Drawing Sheets

(56) References Cited

U.S. PATENT DOCUMENTS

| | | | |
|---|---|---|---|
| 8,700,550 B1* | 4/2014 | Bickford | G01K 15/005 |
| | | | 706/14 |
| 8,712,929 B1* | 4/2014 | Bickford | G06N 20/00 |
| | | | 706/12 |
| 8,743,020 B1 | 6/2014 | Mazuk | |
| 8,913,846 B2 | 12/2014 | Charvet | |
| 8,933,934 B1 | 1/2015 | Hill | |
| 9,195,375 B2 | 11/2015 | Deleris | |
| 9,688,416 B2 | 6/2017 | Ahlbrecht | |
| 10,169,179 B2 | 1/2019 | Viggers | |
| 10,169,840 B2 | 1/2019 | Viggers | |
| 2003/0083756 A1* | 5/2003 | Hsiung | G05B 23/0286 |
| | | | 700/28 |
| 2009/0115637 A1* | 5/2009 | Naimer | G08G 5/0021 |
| | | | 340/979 |
| 2014/0063042 A1* | 3/2014 | Hernandez | G09G 5/00 |
| | | | 345/592 |
| 2016/0071231 A1 | 3/2016 | Bargh | |
| 2016/0143602 A1* | 5/2016 | Hiroike | A61B 6/463 |
| | | | 378/98.5 |
| 2016/0195408 A1 | 7/2016 | Block | |
| 2017/0085852 A1* | 3/2017 | Holub | H04N 9/735 |
| 2019/0130136 A1* | 5/2019 | Claypool | H04N 21/26613 |
| 2019/0286115 A1* | 9/2019 | Wang | B64D 43/00 |
| 2020/0110416 A1* | 4/2020 | Hong | G01S 13/89 |
| 2020/0139959 A1* | 5/2020 | Akella | G05D 1/0214 |

\* cited by examiner

METHOD AND SYSTEM FOR PREVENTING AND DETECTING HAZARDOUSLY MISLEADING INFORMATION ON SAFETY-CRITICAL DISPLAY

CROSS-REFERENCE TO RELATED APPLICATIONS

The present application claims priority to U.S. provisional patent application Ser. No. 62/643,425, filed on Mar. 15, 2018 by the present inventor.

FEDERALLY SPONSORED RESEARCH

Not Applicable.

SEQUENCE LISTING

Not Applicable.

BACKGROUND OF THE INVENTION

This invention relates to safety-critical display application, and more particularly, to methods and systems for preventing and detecting Hazardously Misleading Information (HMI) on safety-critical aircraft cockpit displays.

Primary Flight Display (PFD) is a modern aircraft instrument in the cockpit. PFD presents the most critical flight information, such as attitude, airspeed, altitude, vertical speed and heading direction, to the pilot on an integrated display. There are also Multi-Function Displays (MFD) used for navigation, weather, terrain avoidance, engine displays, and crew alerting system. FIG. 1 shows a simplified cockpit crew station 10 in a typical commercial aircraft. Primary flight display (PFD #1) 12 and multi-function display (MFD #1) 14 are installed in front of the pilot on the left side of the cockpit. Multi-function display (MFD #2) 18 and primary flight display (PFD #2) 20 are installed in front of the co-pilot on the right side of the cockpit. Standby flight instruments 16 are installed between MFDs 14 and 18.

In case of a PFD failure, the PFD screen can be displayed on the adjacent MFD screen through a reversionary scheme. This multiple redundant display architecture ensures that critical flight information is always available for the flight crew. However, before the reversionary scheme can take place, the failure condition must be detected by the system, or by the flight crew. If incorrect information appears as correct and credible under a given circumstance, it may not be detected by the flight crew. This incorrect information becomes misleading, and may have a hazardous consequence depends on its nature and the given circumstances.

Section 4.7.4 of Federal Aviation Administration (FAA) Advisory Circular (AC) document AC25-11B provides a list of failure conditions, associated hazard classifications, and related safety objectives. For example, displaying of misleading attitude information on one primary flight display is classified as hazardous with a qualitative probability of "Extremely Remote". According to the probability terms defined in FAA document AC 25-19A, the probability of displaying hazardously misleading attitude information on one PFD must be on the order of $1\times10^{-7}$ or less. Examples of hazardously misleading information include, but not limited to, outdated aircraft information, freezing display screen, missing symbol, or graphic object being displayed at an incorrect position, with wrong color or intensity.

Most avionic systems use Commercial-Off-The-Shelf (COTS) Graphics Processing Units (GPU) to generate cockpit displays. As pointed out by the FAA Certification Authorities Software Team's (CAST) Position Paper CAST-29, the COTS Graphical Processors (CGP) are originally designed for non-safety-critical and non-aerospace applications, and not typically follow the design assurance guidance as specified in RTCA DO-254. Thus, it will be very difficult and not practical to use a vendor's design assurance process as an acceptable means for compliance. Even though the cockpit display software is developed based on RTCA DO-178 and the Complex Electronic Hardware (CEH) is developed based on RTCA DO-254 processes, the cockpit display system must still include architectural mitigations to ensure protection against displaying hazardously misleading information due to the use of CGP. The system must also evaluate the trustworthiness and severity of any failure detected to avoid any false, unnecessary, distracting, confusing and annoying alarms.

Although the details of a primary flight display vary enormously depending upon the aircraft and the manufacture, the great majority of PFDs follow a similar layout, called the basic-T arrangement. FIG. 2 depicts a typic commercial primary flight display with a basic-T layout arrangement. Under this layout arrangement, Attitude Indicator (AI) 120 is located in the center of the PFD display 100 and provides information about the aircraft's pitch, roll, and turning characteristics. The Air Speed Indicator (ASI) 110 is located to the left side of the attitude indicator 120 and used to display the Indicated Airspeed (IAS), True Airspeed (TAS), Groundspeed (GS) and Calibrated Airspeed (CAS). The Altimeter 130 and Vertical Speed Indicator (VSI) 140 are located to the right side of the attitude indicator 120 and used to depict the aircraft's altitude and vertical speed, respectively. Heading indicator 150 is located below the attitude indicator 120 and used to shown aircraft's heading and navigational information. Mode annunciator 160 along the top of the PFD screen indicates the current operation modes of the aircraft.

FIG. 3 depicts the attitude indicator 200 of the PFD 100 when the airplane is making a turn. The L-shaped symbols 210L and 210R depict the left and right wings of the airplane and are painted with a white border and black inside. The small box 220 between those two wing symbols represents the nose of the airplane and is painted with white a border and black inside. Wing symbols 210L and 210R, as well as nose symbol 220, remain at their fixed position in the attitude display window 200 and are always visible. They may be partially covered by flight director or flight path symbols, which are not enabled in FIG. 3. The artificial horizon 230 is depicted by a white line cross the attitude display 200. One side of the artificial horizon 230 is painted blue to indicate the blue sky 240. The other side of the artificial horizon 230 is painted brown to indicate the brown earth 250. The pitch angle of the aircraft is depicted by a white pitch scale (or pitch ladder) 260, which comprises a group of equally spaced white parallel lines. In this exemplary design, each pitch line (or rung) represents a pitch angle increment of 2.5 degrees.

FIG. 3 shows that the aircraft is pitched up about 5 degrees with respect to the artificial horizon 230. There are white pitch marks 270 for every 10 degrees of pitch increment at each end of the rung. The bank or roll angle is indicated by a white bank scale 292, which is located on the upper portion of the attitude indicator. The solid white upside-down triangle 294 is the bank indicator indicating the zero-bank position. The white division lines along the bank scale 292 indicate 10°, 20°, 30°, 45° and 60° of bank angles on each direction. The white triangle 280 along the center line of the pitch scale is the bank pointer. When the bank pointer 280 is lined up with the white bank indicator 294 (as shown in FIG. 2), the aircraft's wings are completely leveled with the artificial horizon line 230. The white rectangle slip/skid indicator 290 is located under the bank pointer 280. When the slip/skid indicator 290 is lined up with the bank pointer 280, the aircraft is in a coordinate flight. The slip/skid indicator 290 becomes solid when the full displacement is reached. The bank pointer 280 and the slip/skid indicator 290 changes color from white to amber when the bank angle is greater than 35° in either direction. The pitch scale 260 and artificial horizon 230 can be partially covered by the airplane wing and nose symbols 210L, 210R and 220, and clipped by the bank scale 292 (as occurred to pitch mark 293) and the border of the attitude display window 200, as shown in FIG. 3. Additional symbols, which are not shown in FIG. 3, include pitch limit indicator, flight director and flight path vectors. FIG. 3 shows that the aircraft is pitched up 5° and making a coordinated right turn with a bank angle of 30° to the right. The status indicator 296 indicates the autopilot command mode is activated.

ARINC 661 standard has been widely used in cockpit display system (CDS) and user application (UA) software design. FIG. 4 shows the display screen design concept of ARINC 661 specification. Based on the ARINC 661 specification, a display screen 300 may have one or more non-overlapped rectangular display areas, called windows. As shown in FIG. 4, display screen 300 contains four windows, 304, 306, 308 and 310. Windows are owned and managed by the CDS. Each window can have multiple separated or overlapped layers. As shown in FIG. 4, window #2, 306, has three layers, 312, 314 and 316. Each layer has a layer ID and is owned and managed by one UA software or by the CDS. Layers are assigned a static priority that defines the order of their visibility. Each layer can have multiple graphical user interface objects, called widgets in the ARINC 661 specification. As shown in FIG. 4, Layer 3 contains two graphical user interface objects, or widgets, a triangle 320, and a text string 318. Multiple widgets can be grouped together and placed into a container widget, called parent widget. If a parent widget is translated or rotated, all widgets in the container are translated or rotated at the same time. Each widget has its own widget ID and a set of parameters. Some common widget parameters are visibility (visible/invisible), ability (enabled/disabled), X/Y position, X/Y dimension, and color Identification code. Each parameter has also a parameter ID. Therefore, the CDS can identify each parameter by the name of the window, the layer ID, the widget ID, and the parameter ID. During the run time, UA updates the parameters of its own widgets.

As discussed in the previous section, COTS GPUs are typically not designed according to the RTCA DO-254 standard. They may contain millions or even billions of transistors and hundreds of processor cores. They may fail due to design deficiency, external event or other reasons. If such a failure has an impact on the visibility, shape, position or color of any safety-critical widget, it may cause a hazardously misleading information to be displayed on the screen. Thus, the system must verify each of the safety-critical objects (widgets) in order to detect potential hazardously misleading information on the display. The system must also evaluate the trustworthiness and severity of the detected failure so that timely action can be taken without the risk of triggering false, unnecessary and annoying alarms.

Several approaches have been proposed for detecting failures in the display. One approach utilizes an image comparator to check the consistency between video outputs generated from a primary GPU and a monitor GPU. If the difference between these two video outputs is greater than a predetermined threshold, a failure is detected and a warning signal is activated. However, if both of GPUs are COTS parts, the monitor GPU can fail at the same probability as the primary GPU does. Thus, 50% of the detected failures may be false alarms caused by the failures of the monitoring hardware. An unnecessary, annoying or false alarm misinforms and distracts the pilot, and itself may become hazardously misleading information.

Some monitoring systems only verify a small preselected visible or non-visible area of the display. If this selected area is rendered correctly, the entire video display output is deemed as acceptable. However, due to the complicity of the COTS GPU and associated memory devices, it will be difficult to assume that a GPU always has consistent performance and predictable failure modes. Some failures may occur to only a portion of the image without affecting others. Thus, this strategy of testing just a small image sample could let hazardously misleading information be undetected.

Some monitoring systems use the same GPU to generate both the video output image and the verification reference image. Unless the integrity of the verification reference image is independently verified, this approach could not prevent hazardously misleading information being displayed at the required probability level due to common mode design, software and manufacture failures of the same GPU and driving software.

Some monitoring systems perform simple image comparison to detect the difference between the video output image and the verification reference image. An alarm signal will be activated if the image difference is out of tolerance. However, this monitoring strategy could not identify which portion of the image was out of tolerance; it cannot "Provide the flight crew with the information needed to: (i) Identify non-normal operation or airplane system condition, and (ii) Determine the appropriate actions, if any", as required by the Code of Federal Regulation Title 14 Part 25 Section 25.1322 (a) (1).

As shown in FIG. 3, many graphic objects change their positions dynamically. They may be displayed in different colors or covered by other graphic objects. A method of tracking the location and visibility of these graphic objects becomes necessary to properly identify and analyze any detected failure conditions.

SUMMARY OF THE INVENTION

The present invention overcomes the drawbacks associated with the prior art by providing an improved integrity verification system and necessary procedures for preventing and detecting hazardously misleading information on a safety-critical display to achieve the required safety objectives.

The redundant display system of the present invention comprises a plurality of computers, graphics processing units, display units, and object-based integrity verification systems. These computers are interconnected by a communication network for data sharing and health checking. Each computer receives a plurality of sensor input and hosts a user application software for generating at least one sequence of graphic commands. Each graphics processing unit receives graphic commands from at least one computer for rendering at least one video output signal. Each display unit displays at least one video output rendered by at least one graphics processing unit. There are also command links for transmitting graphic commands from computers to graphics processing units, and video links for transmitting video outputs from graphics processing units to display units. Each object-based integrity verification system comprises an object-based integrity verification processor, which identifies a plurality of safety-critical graphic objects, monitors the shape, the location and color of each safety-critical graphic object contained in the video output signal, tracks the visibility and overlay property between safety-critical graphic objects, detects and analyzes failures from safety-critical graphic objects and annunciates detected failure.

A feature of the present invention is the provision of a redundant system architecture to ensure the availability of the safety-critical display system in case of a single point failure.

Another feature of the present invention is the provision of a system level integrity verification processing for preventing and detecting hazardously misleading information on the safety-critical display to achieve the required safety objectives.

Still another feature of the present invention is the provision of an object-based integrity verification system and processes to track and verify the integrity of each safety-critical graphic object depicted on the safety-critical display to detect any hazardously misleading information generated by the graphic processing unit. Since the verification is performed on the display itself and all the safety-critical graphic objects are monitored, it ensures that any potential hazardously misleading information will be detected.

A further feature of the present invention is the provision of utilizing an encoding method, including an object identification code, a monochrome reference ID code image, and a page-based object verification database to track the visibility, shape, position and color information of each safety-critical graphic object depicted on the display. Thus, the system can pinpoint the faulty graphic object even when multiple graphic objects are overlapped in the display.

Another feature of the present invention is the provision of using different fault detection thresholds for different safety-critical graphic objects based on their criticality and characteristics. This feature increases the detecting sensitivity and avoids unnecessary alarms.

Another feature of the present invention is the provision of pinpointing the location of a faulty graphic object so that an appropriate corrective action can be provided.

Yet another feature of the present invention is the provision of displaying proper warning levels, providing appropriate corrective actions, and preventing false, unnecessary, distractive and annoying alarms to avoid triggering hazardously misleading consequences caused by reacting to a false alarm.

Still another feature of the present invention is the provision of integrating the graphic processing unit and the object-based verification system in the computer.

Still another feature of the present invention is the provision of integrating the graphic processing unit and the object-based verification system in the display unit.

Further features will become more apparent in the following description of the embodiments of the invention, and from the appended claims.

LIST OF DRAWINGS

DETAILED DESCRIPTION

The inventor provides a unique method and system for preventing and detecting hazardously misleading information on a safety-critical display. The new system incorporates an object-based integrity verification system to monitor all safety-critical graphic objects on the display. The present invention is described in enabling details in the following examples, which may represent more than one embodiment of the present invention.

Figure 5:
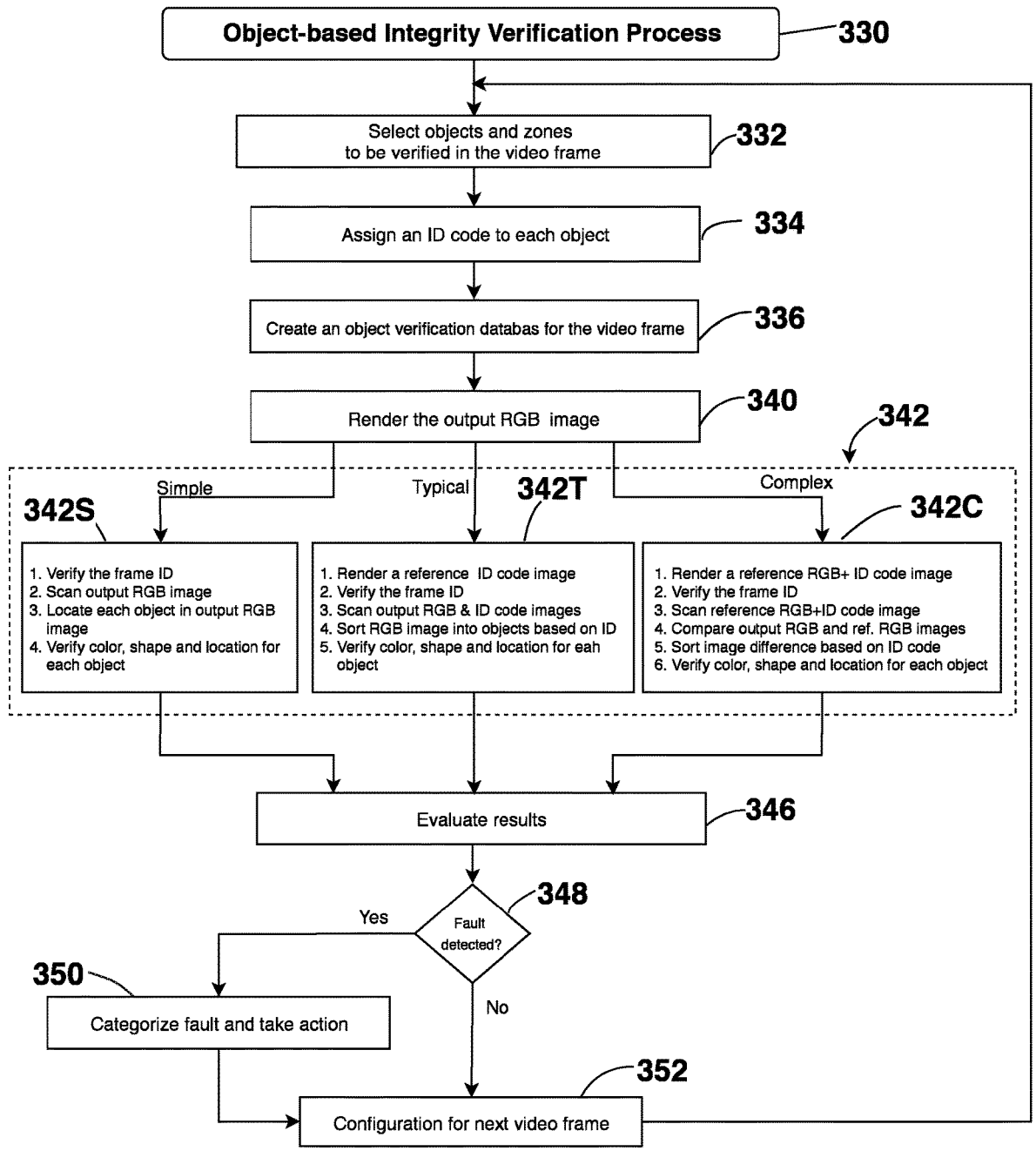
FIG. 5 depicts the flowchart of an exemplary object-based integrity verification process of the present invention.

FIG. 5 depicts the flowchart of an exemplary object-based integrity verification process of the present invention. The object-based integrity verification process 330 comprises the following processing steps.

Figure 1:
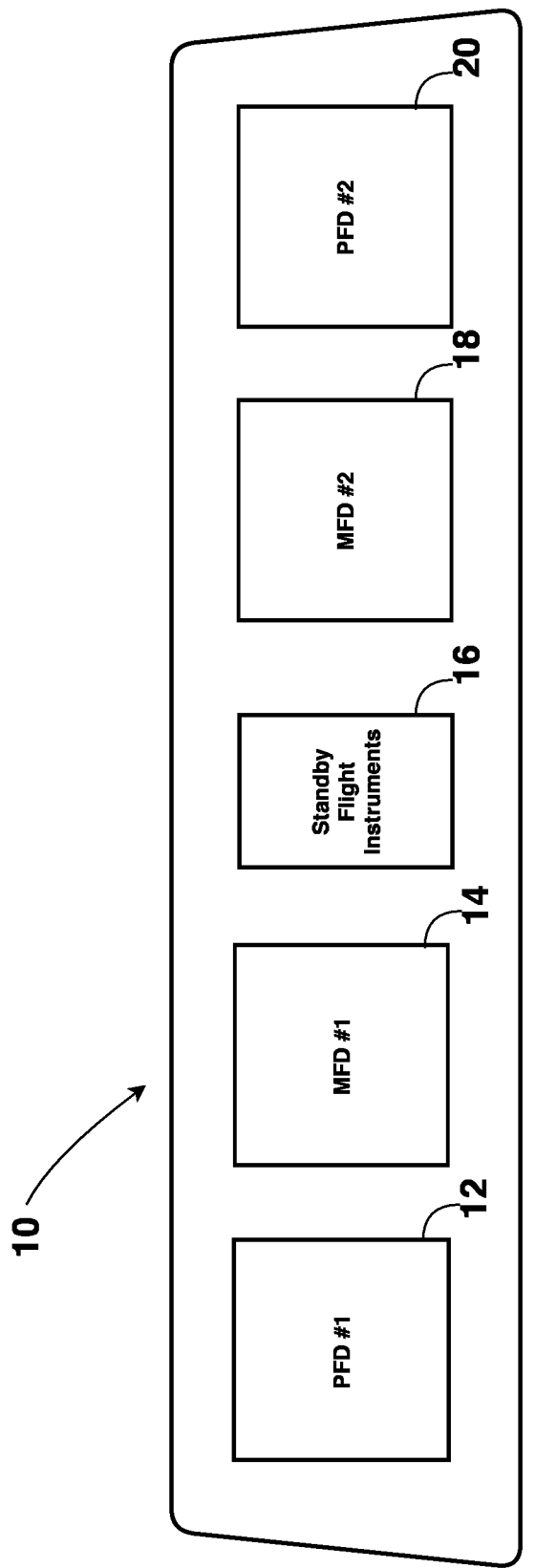
FIG. 1 depicts a simplified cockpit crew station in a typical commercial aircraft.
Figure 2:
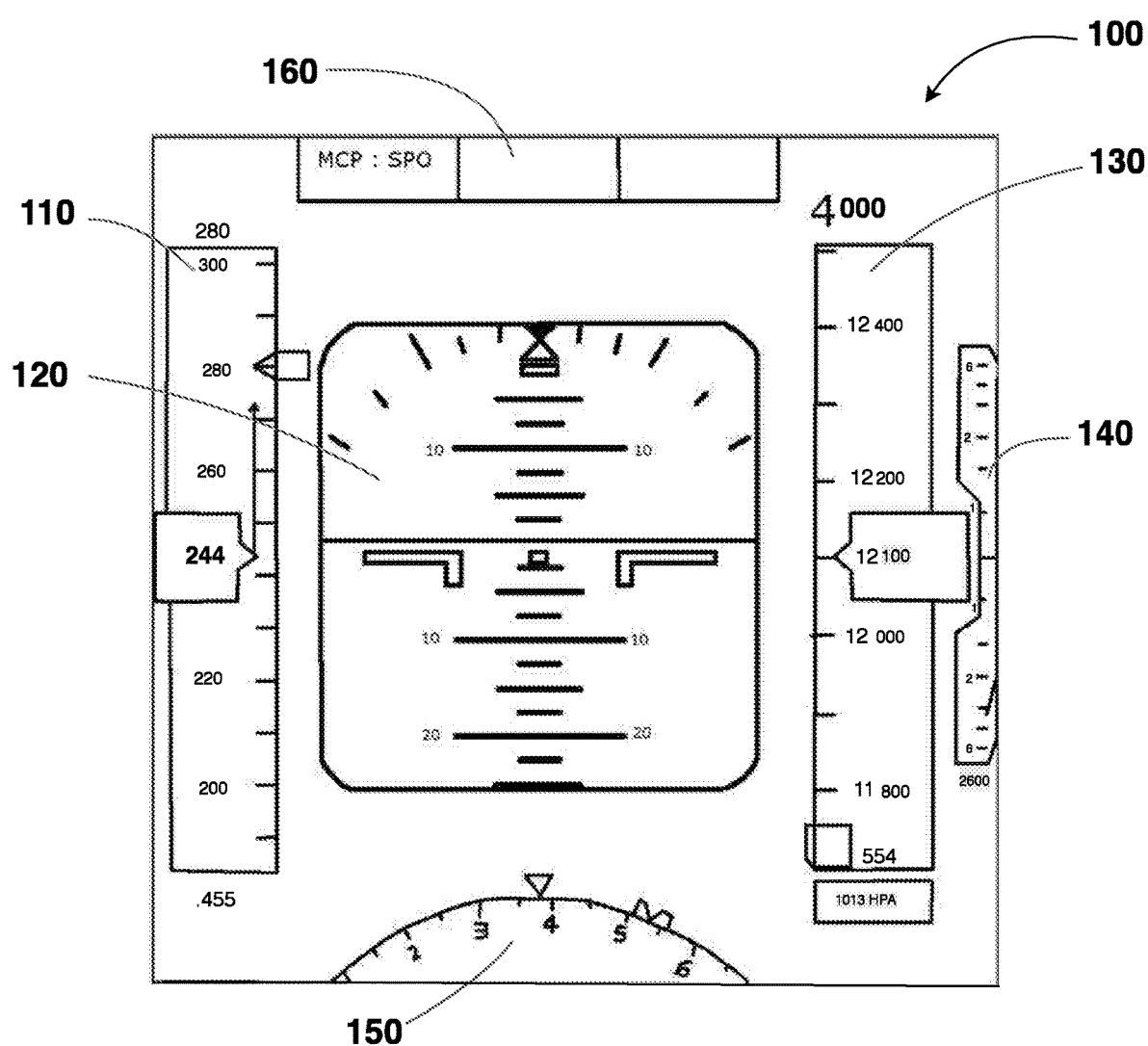
FIG. 2 depicts a typical commercial primary flight display with a basic-T layout arrangement.

The first step is to select a plurality of safety-critical graphic objects (widgets) and a rectangular verification zones to be verified in the video frame, as shown in step 332. The verification zone covers either the entire or just a portion of the video frame to be verified and contains all selected safety-critical graphic objects. Reference to FIG. 2, the verification zone can be selected to cover only the attitude indicator 120 in the primary display screen 100, as an example. Each selected object may represent a unique function, such as bank pointer 280 or airplane's nose symbol 220 in the attitude indicator 200. Based on the screen design, some objects may have single color presentation, such as white color for pitch marks 270; while other objects may contain multiple colors, such as black and white colors for the airplane's wings 210L and 210R.

If verification sub-step 342T or 342C is used, all graphical objects within the verification zone must be selected at the same time, unless the deselected object does not overlay on top of any other selected object. In other words, if an object is deselected, all objects it overlays must also be deselected. This is to correctly represent the visibility and overlay properties of the objects.

If verification sub-step 342S is used, any object can be independently selected or deselected within the verification zone. When verification sub-step 342S is used, a subset of objects can be selected for one video frame, and different subset of objects can be selected for the next video frame. This is to balance the verification workload and the total verification coverage. To provide a faster error detection time, the subset of objects should be selected so that each critical graphic object is verified no less than once every 0.1 seconds. Since the typical video frame rate is 60 frames per second, each safety-critical graphic object should be verified periodically no less than once every six (6) frames. Several widgets may be grouped together as one object, such as the bank scale 292, especially if they remain unchanged in all video frames.

The second step is to assign each of selected safety-critical graphic object a unique non-zero object identification (ID) code, as shown in step 334. Depending upon the number of safety-critical graphic objects contained in the screen, the size of ID code may be either eight (8), twelve (12) or sixteen (16) bit wide. Eight-bit ID code is preferred for verification sub-step 342C if it is desired to fit the 24-bit Red, Green and Blue (RGB) data and the 8-bit ID code data into a common 32-bit wide memory configuration.

Object ID code of zero (0) is reserved for deselected objects. Object with ID code of zero (0) will not be rendered and will not be verified during the verification process 342. It is recommended to assign smaller ID codes to objects in a lower image layer (away from the viewer) and large ID codes to objects in a higher image layer (closer to the viewer). Thus, the ID code represents the height information from the image background. In other words, the ID code represents the Z-dimension of the object from a distant background. The object ID code can be used to determine the visibility or overlay property between objects. The ID code can also be used as a tracking tool to ensure that each critical graphic object is displayed correctly.

The third step is to create an object verification database for the current video frame, as shown in step 336. This database comprises a plurality of parameters selected from a group comprising a sequential frame counter to identify the current video frame being displayed on the monitor screen; a look-up table to map at least each non-zero object index code to its corresponding window number, layer ID and widget ID or IDs, as defined in ARINC 661 specification; The X-Y coordinates of the verification zone which contains all the selected objects; the total number of pixels contained in each object; the geometric boundary of each object; a list of RGB or Hue, Saturation, Value (HSV) colors contained in each object and corresponding color tolerances; a list of vertex X-Y coordinates for each line drawing object; the text content of each alpha-numerical string object; the amount of pixel translation representing the pitch angle for each pitch scale related objects; the bank angle of the airplane; the amount of slip/skid screen offset; a memory structure to store the intermediate and final verification results for each object; a list of rules for fault handling; pre-calculated object images; and font patterns under different rotating angles for pattern matching. Other information can also be added to the verification database to satisfy the processing needs.

The next thing to do is to render the video output RGB image, as shown in step 340. This can be done by a COTS GPU based on the Definition File (DF) and the widget library according to the ARINC 661 specification. The rendered image may include anti-aliasing, alpha blending and dithering features. Embed a sequential frame ID number in the GPU's drawing buffer for detecting a potential frame buffer swapping failure. Include this sequential frame ID number in a non-visible area of the corresponding video frame, preferably in the vertical sync back porch area, for detecting the freezing screen fault. Embed an error detecting code, such as Cyclic Redundancy Check (CRC) code, at the end of each video line. The error detecting code is calculated for each color layer individually, and embedded in the horizontal blanking period of the image. The verification zone and objects selected in step 332, and ID code assigned at step 334 have no impact on the output RGB image.

The next step is to scan and verify the output RGB image, as shown in step 342. Step 342 includes three optional sub-steps, including 342S, 342T and 342C. Only one verification sub-step is required at a time based on the complicity of the display and the available system resources. Verification sub-step 342T utilizes a single channel reference ID code image to distinguish and identify the objects in the output RGB image, and is suitable for most PFD display screens. Verification sub-step 342C utilizes a four channel RGB+ID reference image and is most suitable for a complex PFD display screen with more symbols, more color contents and video background (such as camera image or synthetic vision background). Verification sub-step 342S can be used to verify a simple display frame with fewer selected objects and fewer overlaid layers. Verification sub-step 342S do not require additional graphic engine support. Thus, the verification sub-step 342S can be used as a backup verification procedure, in case 342T or 342C monitor hardware fails.

The first task of the verification sub-step 342S is to extract the embedded frame ID number from the non-visible vertical sync back porch area of the output RGB image. If the frame ID number does not match the frame counter value stored in the verification database, a frame fault is detected; and the verification sub-step 342S will be aborted.

The second task of the verification sub-step 342S is to scan in the output RGB image line-by-line and verify the CRC code. Inside the verification zone, each video line is separated into connected line segment based on the pixel RGB or HSV values. The color content and starting and ending pixel coordinates of each line segment are recorded in the memory structure of the verification database. After a video line is scanned in, the connectivity of the line segments between the current video line and the previous line is processed and determined. At the end of the verification zone, all line segments and their connectivity in the verification zone are determined.

The third task of the verification sub-step 342S is to locate each object based on the color, vertex coordinates, shape and geometric boundary information stored in the verification database. If pre-stored object Images and character fonts are available in the verification database, image processing and pattern recognition methods can be used to locate each of the objects in the verification zone. After objects are identified, the scanned line segment information is, then, sorted and stored in the memory structure according to the corresponding object ID code.

The fourth task of the verification sub-step 342S is to verify the color, location, rotation angle, connectivity for line drawing objects; and color, location, rotation angle and text content for alpha-numerical objects. For example, each rung of the pitch scale is to be verified for its color, vertex coordinates, and pixel locations between the two vertices. The rotation angle and the center position of this rung is also verified against the data stored in the verification database. The pitch scale marks are also verified for correct labeling. The pitch angle is verified by comparing the relationship between location of the nose symbol 220 and the location of the pitch scale 260. If the object ID code is assigned based on the height of the object, the ID code can be used to verify the overlap between objects.

In verification sub-step 342T, the first task is to render a single channel monochrome reference ID code image. The X-Y dimension of the reference ID code image can be as large as the visible area of the output RGB image, or as small as the verification zone as specified in the verification database. The pixel depth of this reference ID code image can be either eight (8), twelve (12) or sixteen (16) bits, depending upon the maximum number of objects contained in the verification zone. This reference ID code image is generated by clearing the drawing area with zero (0) value first, then drawing each selected object using its ID code as its color component. The drawing sequence is important to preserve the same visibility priority as in the output RGB image. If the object ID code is assigned based on the height of the object layer in step 334 (lower object layer with a smaller ID code and higher object layer with a larger ID code), objects with smaller ID code must be drawn first based on a lower-layer-object-first drawing sequence. During the drawing process, anti-aliasing, alpha blending and dithering features must be all disabled. Thus, the ID code of an object in a lower layer will be replaced by the ID code of an overlaying object in a higher layer. This reference ID code image represents the shape, location and overlapping priority of all the selected objects in the output RGB image. This reference ID code image can be rendered by either the same COTS GPU which generates the output RGB image, a different COTS GPU, a central processor, or a DO-254 certified CEH device. Error detecting code, such as CRC code, can be embedded in each horizontal blanking period of the ID code image.

The second task of verification sub-step 342T is to extract and verify the embedded frame ID number from the non-visible vertical sync back porch area of the output RGB image. If the frame ID number does not match the frame counter value stored in the verification database, a frame fault is detected; and the verification sub-step 342T will be aborted.

The third task of verification sub-step 342T is to scan the output RGB and the ID code images, and verify their error detecting codes in a line-by-line fashion.

The fourth task of verification sub-step 342T is to sort the RGB pixel value based on the ID code at the same X-Y coordinates over the verification zone. The RGB pixels associated with the same ID code is processed by an occurrence counting program, such as a histogram, to calculate the color distribution based on color bins listed in the verification database for this particular object ID. If an out of tolerance RGB pixel is detected, it will be cumulated in an out-of-band color bin in the histogram. As an option, the RGB value can be converted to HSV value before being processed by the histogram program. If the ID code image is generated by the same COTS GPU which generated the output RGB image, the integrity of the ID code image is to be verified. The location of each line segment of the object in an ID code video line is scanned and located. The video line number (Y-coordinate) and starting and ending pixel X-coordinates of each line segment are recorded in the memory structure for each ID code in the verification database. This process is repeated for each video line. At the end of the verification zone, all objects are sorted based on their ID codes.

The fifth task of verification sub-step 342T is to verify the results of the histogram for the color of each objects in the output RGB image, and the shape and location of each object in the ID code image. The results of the histogram program are reviewed to determine if the cumulated pixel counts for each expected color are within the tolerance for each object ID code.

The ID code line segment and its connectivity between adjacent video lines are reviewed to determine if the shape, size and location of each object is within the tolerance for each object ID code. For example, each rung of the pitch scale is verified for its color, vertex coordinates, rotating angle and pixel locations between the two vertices. Each pitch mark is also verified for its location, rotating angle and numerical content. The above verification process is required to prevent common failure mode caused by using the same COTS GPU for both RGB output and ID code image.

If the reference ID code image is rendered by a different COTS GPU or by a hardware device certified at DO-254 level C or higher, the above integrity verification for the ID code image is only required for objects that failed the histogram test. This is to verify that the detected fault is not caused by a failure in the reference ID code image. More detailed operation about sub-step 342T will be depicted in FIG. 6.

In verification sub-step 342C, the first task is to render a four-channel reference RGB+ID code image. The X-Y dimension of the reference RGB+ID code image can be as large as the visible area of the output RGB image, or as small as the verification zone defined in the verification database. The pixel depth of the three reference RGB channels is the same as that of the output RGB image. The pixel depth of the reference ID code image can be either eight (8), twelve (12) or sixteen (16) bits. Eight (8) bit ID code is preferred if the four-channel RGB+ID reference image is to be fit into the standard 32-bit memory configuration. The three reference RGB channels in the reference image must be rendered in the same way as used to generate the output RGB image, with the same settings for the antialiasing, alpha blending and dithering features.

The reference ID code image is generated by clearing the drawing area with zero (0) value first, then drawing each selected object using its ID code as its color component.

The drawing sequence is important to preserve the same visibility priority as in the reference RGB channels. If the object ID code is assigned based on the height of the object layer in step 334 (objects in a lower object layer having a smaller ID code, and objects in a higher object layer having a larger ID code), objects with smaller ID code must be drawn first based on a lower-layer-object-first drawing sequence. During the drawing process, anti-aliasing, alpha blending and dithering features must be all disabled. Thus, the ID code of a lower object layer is replaced by the ID code of an overlaying higher object layer. This reference ID code image represents the shape, location and overlapping priority of all the selected objects.

It is desired to generate this reference RGB image by a separated verification COTS GPU, and the reference ID code image by either the same verification COTS GPU or by a DO-254 certified CEH device.

The second task of verification sub-step 342C is to extract and verify the embedded frame ID number from the non-visible vertical sync back porch area of the output RGB image. If the frame ID number does not match the frame counter value stored in the verification database, a frame fault is detected; and the verification sub-step 342C will be aborted.

The third task of verification sub-step 342C is to scan in the reference RGB+ID code image, verify the error detecting codes, and save the images into memory for later usage.

The fourth task of verification sub-step 342C is to compare the output RGB image and the reference RGB image over the verification zone on a pixel-by-pixel basis.

The fifth task of verification sub-step 342C is to sort the image difference based on the reference ID code, and run a separate histogram process on the color difference for each reference ID code.

The sixth task of verification sub-step 342C is to verify the color difference between images, and the shape and location of each selected object. The histogram of the difference image is reviewed for each object. If the color difference is within tolerance for all objects, there will be no fault detected. Otherwise, the reference RGB+ID code images saved in the third task will be pulled out from the memory. If the ID code image was not generated by a certified hardware device at a DO-254 level B or higher, a pattern recognition process will be performed over the ID code image to check if the shape, size and location of each failed object were generated correctly. If the ID code image was generated correctly or it was generated by hardware certified at DO-254 level B or higher, two histogram processes will be performed on each failed object for each of the reference and output RGB images. The results of the histogram will be compared with the expected value stored in the verification database to determine which image was out of tolerance.

The results of the verification step 342 are evaluated at step 346. Depending upon which sub-step is used in the verification step 342, the possible failure modes may include the followings selected from a group comprising a failed reference ID code image, failed reference RGB image, failed output RGB image, or improper tolerance setting of the color difference histogram. By applying the fault handling rules listed in the verification database, a real failure can be identified.

A decision is to be made at step 348. If there is no fault detected, the process is transferred to step 352, otherwise the process is transferred to step 350.

At step 350, the fault condition will be categorized based on the severity and the duration of the fault condition, as well as the flight circumstance. The original display window ID, layer ID, object ID and parameter ID can be retrieved from the verification database according to the ID code of the failed object. Therefore, the impact and severity of this fault related to the roll, pitch and slip/skid parameters can be determined. Proper warning signal, such as warning, alarm or caution, can be invoked in a timely manner to alert the pilot the location and failure condition in details. Appropriate corrective action can also be provided to the pilot according to the airplane's procedures.

At step 352, the process for the next video frame is configured. If there is no fault detected at the current step, the same verification procedures will be repeated for the next video frame. If the fault condition was triggered by a failed reference ID/RGB image, a back-up verification sub-step may be used to verify the future video frames. Timer or counter will be started to monitor the duration of the failure condition. At the end of step 352, the process control will be transferred to step 332 for the next video frame.

Because the integrity verification process 330 is object-based, it can set up different detection thresholds for different objects based on their criticality and characteristics. Therefore, it can effectively detect failures occurred at only a few pixels on a smaller safety-critical graphic object, such as the aircraft nose symbol 220. It can also prevent from triggering unnecessary alarm on a low priority feature, such as the color uniformity due to the dithering effect of the large brown earth symbol 250. Thus, the integrity verification process 330 can effectively detect hazardously misleading information to achieve the required safety objectives set by the certification authority. Process 330 can also prevent and detect failures in the monitoring hardware. This ensures that the probability of displaying misleading information caused by failures of the monitoring hardware also meets the required safety objectives set by the certification authority. As a result, it prevents from triggering hazardously misleading consequences caused by the pilot's response to a false alarm.

Verification step 342 contains three monitoring hardware architectures. If the monitoring hardware system in sub-step 342C fails, the verification sub-step 342T or 342S may be used as a backup. This is very valuable, especially when the reversionary option is not available due to lack of the second display unit.

Figure 6:
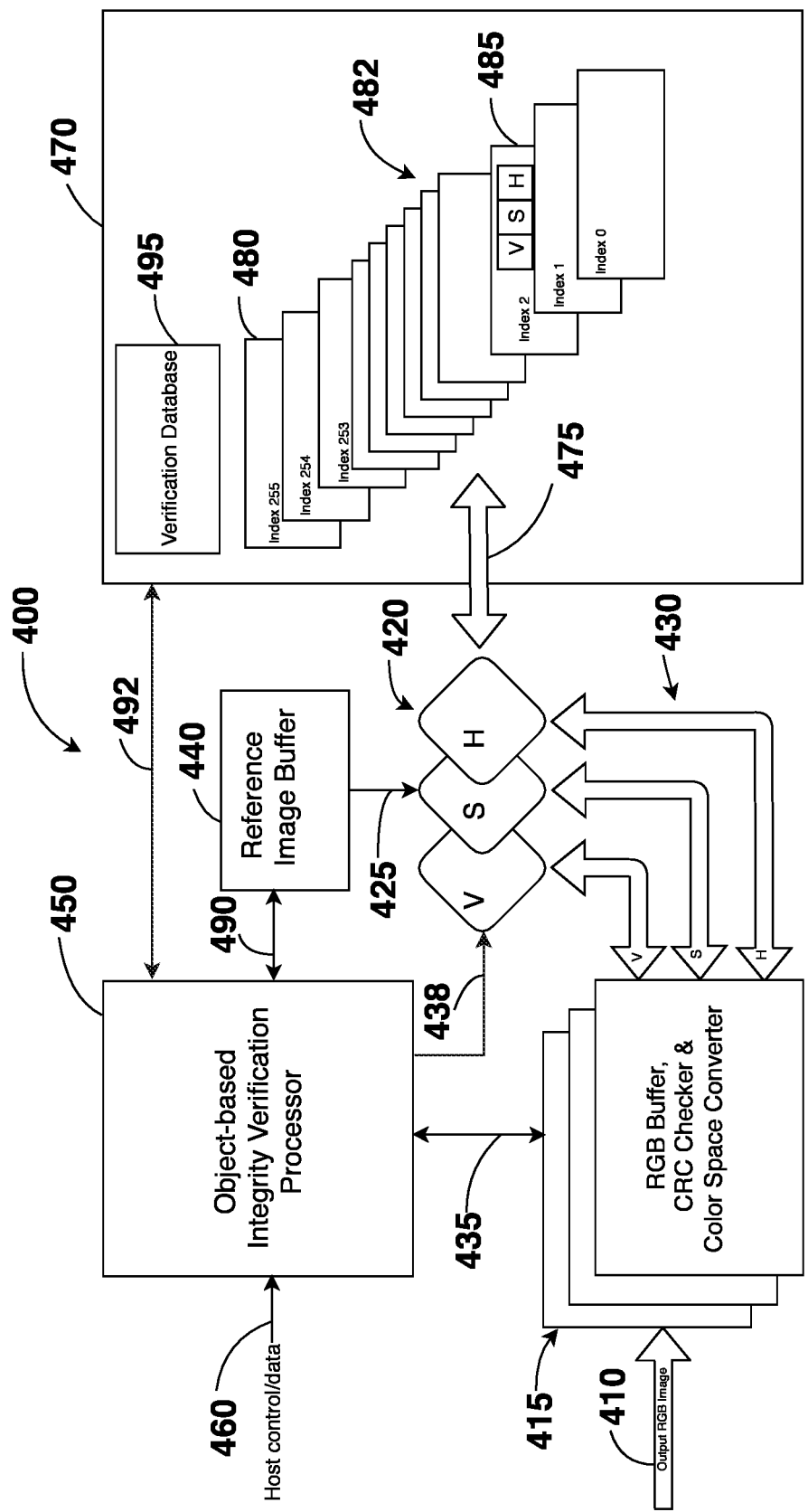
FIG. 6 depicts the block diagram of an exemplary object-based integrity verification system of the present invention.

A block diagram of the exemplary object-based integrity verification system 400 is shown in FIG. 6. This system utilizes the object-based integrity verification process 330 and the verification sub-step 342T as shown in FIG. 5. This verification system is built around a certifiable CEH hardware platform using a Field-Programmable Gate Array (FPGA) with an integrated processor, such as Xilinx Zynq-7000, or any other suitable device. The object-based integrity verification processor 450, the RGB buffer, CRC checker and Color space converter 415, and triple histogram processor 420 can all be implemented in the same selected FPGA device. The reference image buffer 440 and the verification memory 470 can be implemented using memory devices supported by the selected FPGA.

The object-based integrity verification processor 450 received the control and data information 460 from an external host processor, which is not shown in FIG. 6. The verification processor 450 selects objects and verification zone in the video frame to be verified, according to the process step 332; and assigns ID code based on the process step 334. An object verification database 495 is created following the process 336, and is stored in the verification memory 470.

The reference ID code image is rendered by the verification processor 450. Although there are FPGAs with embedded GPU engine available on the market, it is preferred to render the ID code image using hardcore CPU or the FPGA logic to reduce the certification efforts and cost.

It is preferred to verify all objects in the verification zone, such as the entire attitude display, in the same video frame. It is also preferred to define objects in such a way that each object contains only one nominal color. For example, the wing symbol 210L can be split into a black inner object and a white outer object so that each of which contains only one nominal color. If there are too many objects to be verified at the same time, a 12- or 16-bit ID code can be used. An ID code is assigned to each selected object according to the distance from a distant background. The blue sky 240 and the brown earth 250 are closer to the distant background, therefore, they should be given smaller ID numbers. The aircraft wing symbols 210L and 210R, the nose symbol 220 and the bank scale 292 are on top of the pitch scale 260 and should be given larger ID numbers. There are other symbols which may overlay on top of the wing symbols, such as fight director (not shown). Thus, some ID numbers should be reserved for these objects. Refer to steps 332 and 334 for other details.

The verification processor 450 updates the verification database 495 through a verification memory control and data bus 492 for the video frame to be verified according to the step 336. If the ID code image is rendered by a CEH hardware with required Design Assurance Level (DAL) level (such as B or A), there will be no need to verify the integrity of the ID code image during the following verification process. The verification database 495 comprises parameters selected from the a group comprising a sequential frame counter representing the frame sequence number embedded in the video frame; a look-up table to retrieve the corresponding window, layer and widget IDs in the define file for each object; the X-Y coordinates of the verification zone; a list of nominal HSV colors contained in each object and associated tolerance; a list of HSV shading colors which could be produced during the antialiasing or dithering operation in the output RGB image 410, and associated tolerance; a list of HSV blending colors which each object may overlay or being overlaid in the output RGB image 410 during the alpha blending operation; and a list of fault handling rules. Refer to step 336 for other details.

The external GPU renders the output RGB image 410 according to verification step 340.

Figure 3:
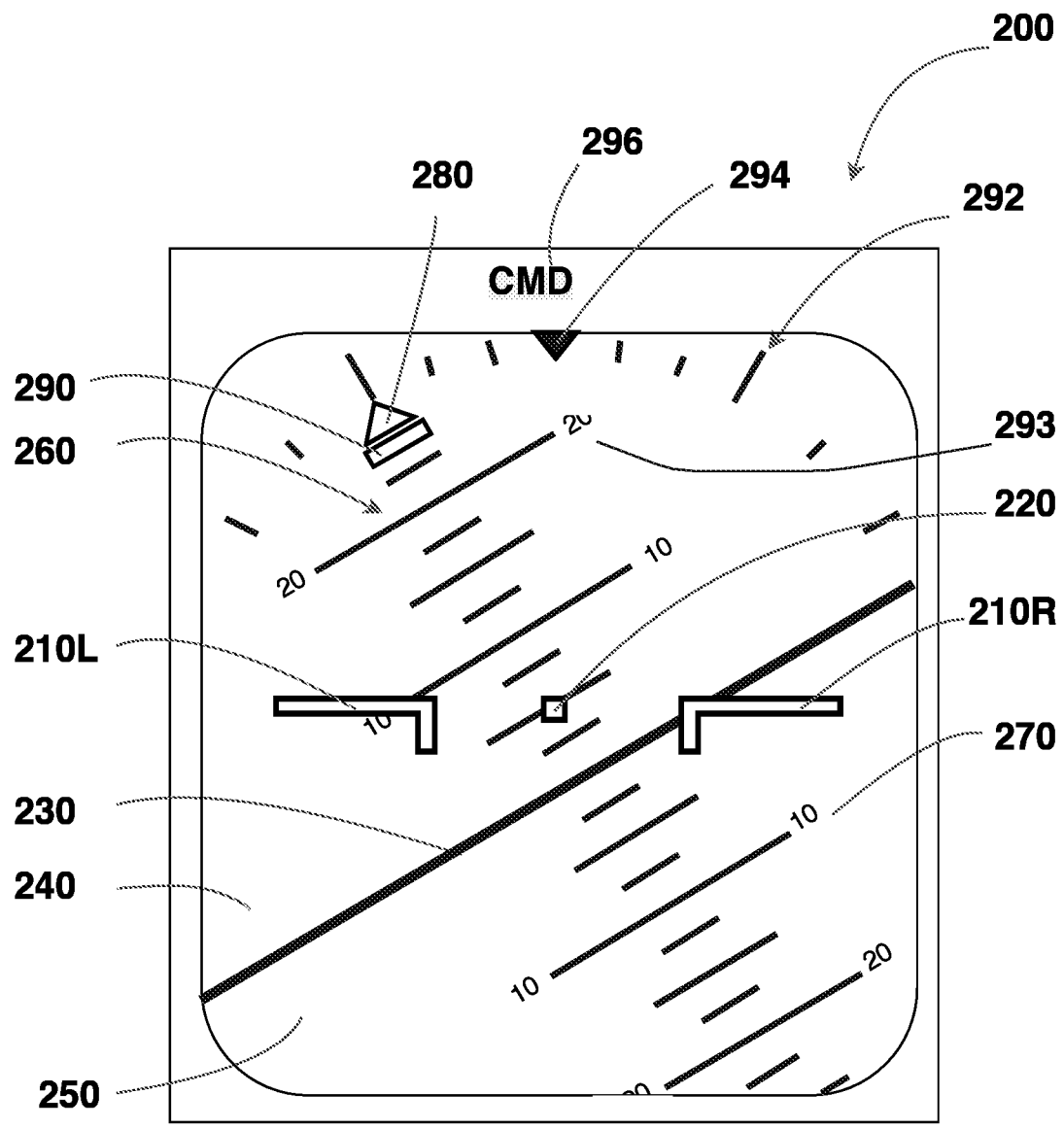
FIG. 3 depicts the typical attitude indicator of a primary flight display when the aircraft is making a right turn.
Figure 4:
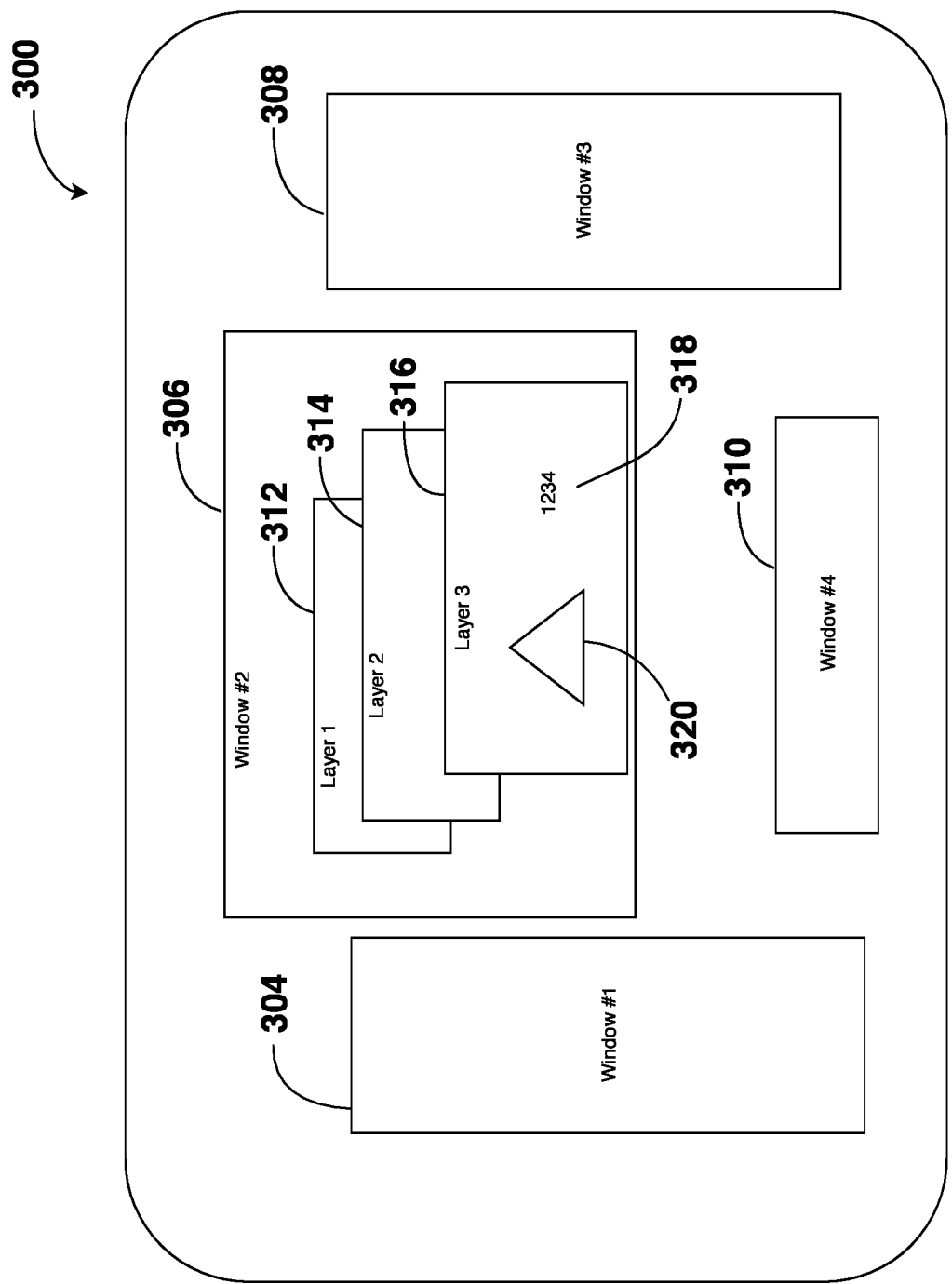
FIG. 4 depicts the display screen design concept of the ARINC 661 standard.

The verification sub-step 342T is selected for this implementation, as an example. This exemplary verification processor 450 renders the monochrome ID code reference image based on the first task described in sub-step 342T. Objects with smaller ID numbers should be drawn first. For the attitude indicator 200, for example, the blue sky 240 and brown ground 250 should be drawn first, followed by the artificial horizon 230, then the pitch scale 260, pitch marks 270, bank pointer 280 and slip/skid indicator 290. The bank scale 292, bank indicator 294, two wing symbols 210L and 210R, and nose symbol 220 should be the last objects on the drawing list. The object number should be used as color component for the drawing action, without antialiasing, alpha blending or color dithering. The ID code image is binary in nature. Thus, a pixel will not be pained if the percentage of the object coverage at this pixel is less than a predetermined threshold value, such as 50%. The bigger this threshold value is, the less color blending error will be detected at the top layer object, and more color blending error will be detected at the bottom overlaid object. The clipping property is also to be resolved so that the extended portion of the pitch scale will not interference with the bank scale, as shown as pitch mark 293 in FIG. 3. The finished reference ID code image is stored in reference image buffer 440 through a reference image control data bus 490.

The output RGB image is rendered by an external COTS GPU (not shown in FIG. 6.) with embedded sequential frame ID number in the vertical sync back porch and a line error detecting code CRC in the horizontal blank period. The output RGB image is sent to a display device to communicate with the pilot. This output RGB image is also looped back to the integrity verification processor system 400. This RGB image 410 is stored in a temporary RGB buffer in the RGB buffer, CRC checker and color space converter 415, where the embedded sequential frame ID number is retrieved to detect potential freezing screen failure. The CRC code is also calculated for each video line and verified with the CRC value stored in the horizontal blanking area to ensure the received RGB image 410 was transmitted correctly. The CRC code is verified over the entire video frame, independent with the size of the verification zone selected. The RGB data is then converted to HSV data for processing, since the HSV color space is a better representation of the human vision than the RGB color space is. The sequential frame ID number and the CRC checksum results are reported back to the verification processor 450 through a data bus 435.

Unless a wrong sequential frame ID number is detected, the verification processor 450 generates time signals 438 to scan and analyze the HSV output signals 430 from the color space converter in function block 415. Within the verification zone, the triple histogram processor 420 sorts the HSV signal 430 based on the reference ID code 425 received from reference image buffer 440. The triple histogram processor 420 updates and saves the intermediate occurrence counting results of the histogram program in a histogram database 482 through a triple histogram processor control/data bus 475. The histogram database 482 comprises a paged structure, where each page is used to store the histogram for only one object ID. For example, in the 8-bit ID code mode, histogram page 480 is used to store the histogram for all pixels with object ID code of 255; while histogram page 485 is used to store the histogram for all pixels with object ID code of 2. Each histogram page comprises a plurality of nominal, shading and blending HSV colors, as specified in the verification database. It also comprises a plurality of color bins, including one bin for each nominal color and shading colors contained in this object, one blending color bin for colors which may be produced by the alpha blending operation, and one extra bin for the out of tolerance color. When a new HSV value 430 is received by the triple histogram processor 420, the histogram page indexed by the corresponding reference ID code 425 is selected. If this HSV value is within the tolerance of a nominal color bin or a shading color bin in the selected page, the counter of the corresponding color bin will be increased by one. Otherwise, if the HSV value can be interpreted as a properly mixed color between the nominal color and one of the blending colors, the counter of the blending color bin will be increased by one. If this HSV value is not belong to any of the above color bins, the counter of the out of tolerance bin will be increased by one. The out of tolerance HSV value, as well as the pixel's X-Y coordinates will be saved in a separate area in the selected histogram page for later evaluation.

The above verification process is completed when the entire verification zone is scanned. If the pixel counts for all normal, shading and blending color bins are as expected, and there is no out of tolerance pixel detected from any selected objects, the current video frame is considered as acceptable unless there is a CRC error detected in other area. Otherwise, the results have to be reviewed to determine the cause and the impact of this faulty condition. Based on the fault handling rules store in the verification database, proper action can be taken.

Since the ID code image is generated using a CEH device, which is DO-254 certified at DAL level B or A, it ensures that the probability of displaying hazardously misleading information is on the order of $1\times10^{-7}$ or less. Furthermore, since there is no antialiasing, alpha blending or dithering feature used to render the reference ID code image, the certification costs and efforts are reduced.

Although the object-based integrity verification system 400 is primarily designed based on a CEH device which is certified at DAL level B or higher, the verification system 400 can also support other configurations, as described in the verification process 330. For example, if the ID code image is only certified at DAL level C (failure rate at $1\times10^{-5}$ or less), the integrity of the ID image has to be verified for those objects failed the histogram test. For example, if the artificial horizon line 230 was failed, its vertex locations and line angle are to be verified in the ID image. See description in sub-step 342T for more details. This additional ID code image integrity verification operation should be certified at DAL level B or higher, in order to ensure that the rate of false alarm due to a monitor system hardware failure is on the order of $1\times10^{-7}$ or less. If the ID code image verification operation is certified at DAL level B or higher, the RGB reference image used in sub-step 324C can be rendered by a GPU certified at DAL level C. This reduced the certification efforts, especially when the object-based integrity verification processor 450 already includes a GPU (as in Xilinx Zynq-UltraScale+MPSoC). Depending upon the system architecture, it can be selected to certify either the processing to render the ID code image, or the processing to verify the ID code image at DAL level B or higher. This is to ensure that the rate of false alarm can meet the required safety objective of $1 \times 10^{-7}$ or less.

Figure 7:
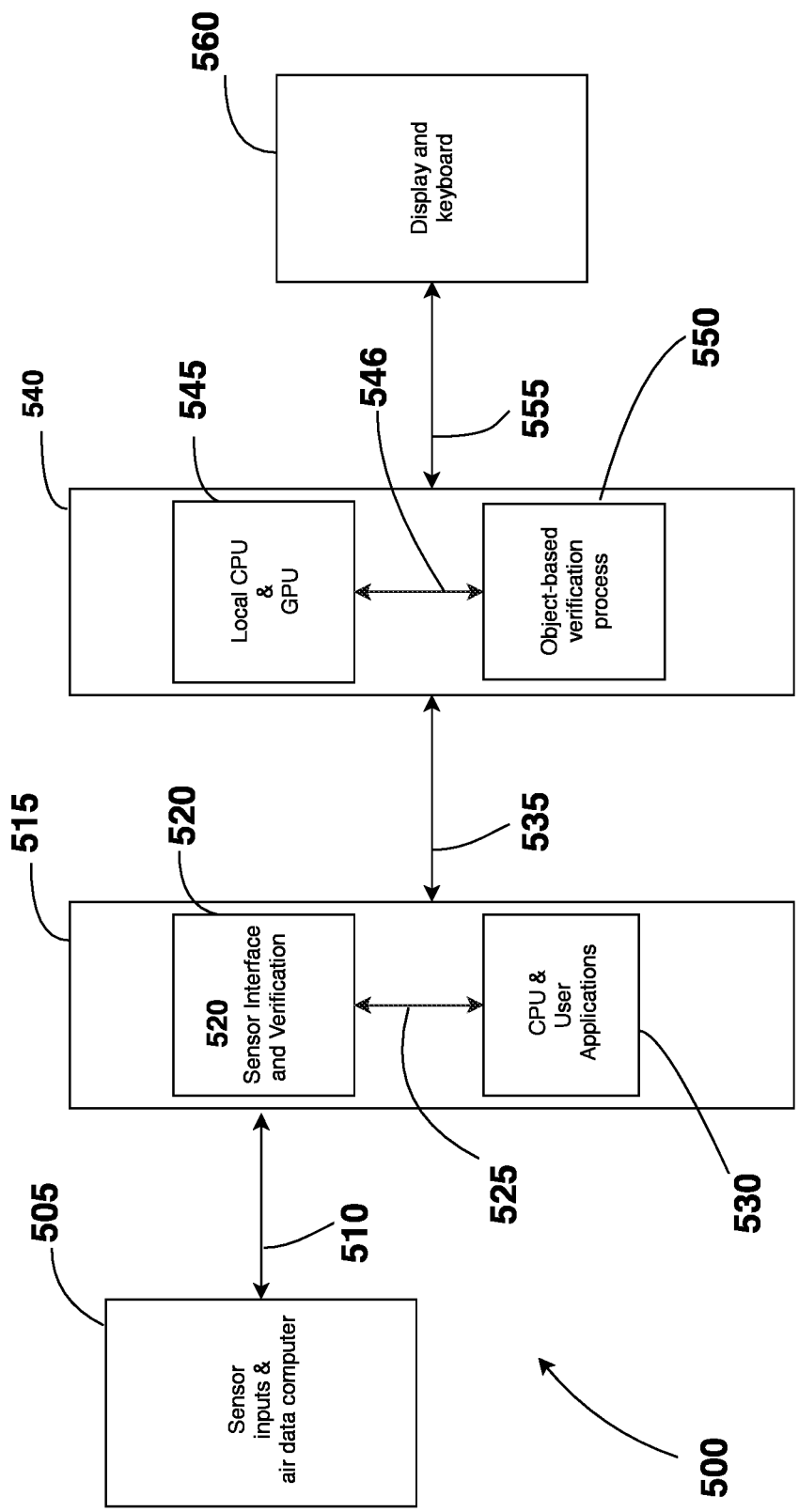
FIG. 7 depicts the block diagram of an exemplary cockpit display system of the present invention.

As indicated in the previous sections, the cockpit display system must include architectural mitigations to ensure protection against displaying hazardously misleading information. Although the above-mentioned object-based verification process can effectively detect failure associated with the COTS GPU, there are other failure sources can also cause hazardously misleading information being displayed. These failure sources including sensor failure, wrong graphic commands being sent from the user application program to the display system and wrong keyboard input at the user interface. FIG. 7 shows the function block diagram of an exemplary embodiment of the present invention which includes architectural mitigations to protect against displaying hazardously misleading information on the cockpit display.

As shown in FIG. 7, the exemplary cockpit display system 500 of the present invention comprises a sensor inputs and Air Data Computer (ADC) function block 505, a Central Processor Unit (CPU) function block 515, a GPU function block 540 and a display and keyboard function block 560.

Sensor data inputs and ADC function block 505 comprises airspeed, altitude, air temperature, vertical speed, angle of attack and barometric pressure sensor sources, which are processed by the ADC; and turn coordinator, heading indicator and attitude indicator information from Attitude and Heading Reference System (AHRS not shown). Independent and redundant sensors are used for pilot and co-pilot. Sensor inputs function block 505 comprises also navigation and engine information. The sensor inputs and ADC function block 505 communicates with CPU function block 515 through a redundant sensor communication link 510, which is implemented using a suitable protocol selected from a group comprising ARINC429, ARINC 629, MIL-STD-1553, ARINC664 and others.

CPU function block 515 comprises a sensor interface and verification section 520 for receiving and validating the sensor input data. If a sensor failure is detected, the sensor interface and verification section 520 will automatically switch to the working sensor source and annunciate this corrective action. This prevents hazardous misleading sensor information being displayed on the cockpit display. CPU function block 515 also hosts a CPU and User Application (UA) software section 530. UA generates graphic commands based on the selected sensor inputs 525 from the sensor interface and verification section 520. User application software in section 530 is preferably implemented based on ARINC661 or similar specification. CPU function block 515 communicates with GPU function block 540 through a CPU communication link 535, which is implemented using protocols selected from a group comprising ARINC629, MIL-STD-1553, ARINC664 and others. UA in section 530 also processes the user's inputs and status reports received from CPU communication link 535.

GPU function block 540 comprises a local CPU and GPU section 545 and an object-based verification process section 550 of the present invention. The local CPU in section 545 monitors the graphic commands received through the CPU communication link 535, and alert the pilot if graphic command is missing, inconsistent or invalid. It also performs Built-In-Tests (BIT) and verifies the pilot inputs received from display and keyboard function block 560. The GPU in section 545 renders the screen display based on the verified graphic commands. The video output of the GPU in section 545 is sent to the display and keyboard function block 560 through a video and communication link 555, which is implemented using protocols selected from a group comprising LVDS, DVI, HDMI, DisplayPort, PanelLink, RS232, RS422, and others. Error detecting code, such as CRC, is embedded in the video output for integrity verification.

The video output generated from the GPU in section 545 is also sent to an object-based verification process section 550 of the present invention through a verification data bus 546 to check the image integrity. Video frame parameters and a plurality of safety-critical graphic objects rendered by the GPU in section 545 are verified to detect any image fault, such as image freezing, incorrect safety-critical graphic object's shape, size, color, orientation and readability problems. Detected fault is categorized based on the criticality of the graphic object, the severity of the fault, the duration of the problems and the flight circumstance. The object-based verification process 550 determines the alarm level, such as warning, caution and advisory required. The object-based verification process 550 of the present invention is designed to detect hazardously misleading information without triggering false, unnecessary, distractive and annoying alarms.

Display and keyboard function block, 560, comprises a flat panel display and user input devices, such as keyboard or touch device. Display and keyboard function block 560 may contain small temporary memory buffer for processing the image received, but does not contain a full frame buffer to prevent from potential frame freezing problem. Other display faults, such as loss of display screen or display jittering occurred inside the display device in function block 560, can be easily identified by the pilot, and will not be categorized as misleading information.

Depending upon the system architecture, the GPU function block 540 can be integrated with either the display and keyboard function block 560 in an Electronics Display Unit (EDU), or the CPU function block 515 in a flight management system, such as an Integrated Modular Avionics (IMA) computer or a mission computer.

Figure 8:
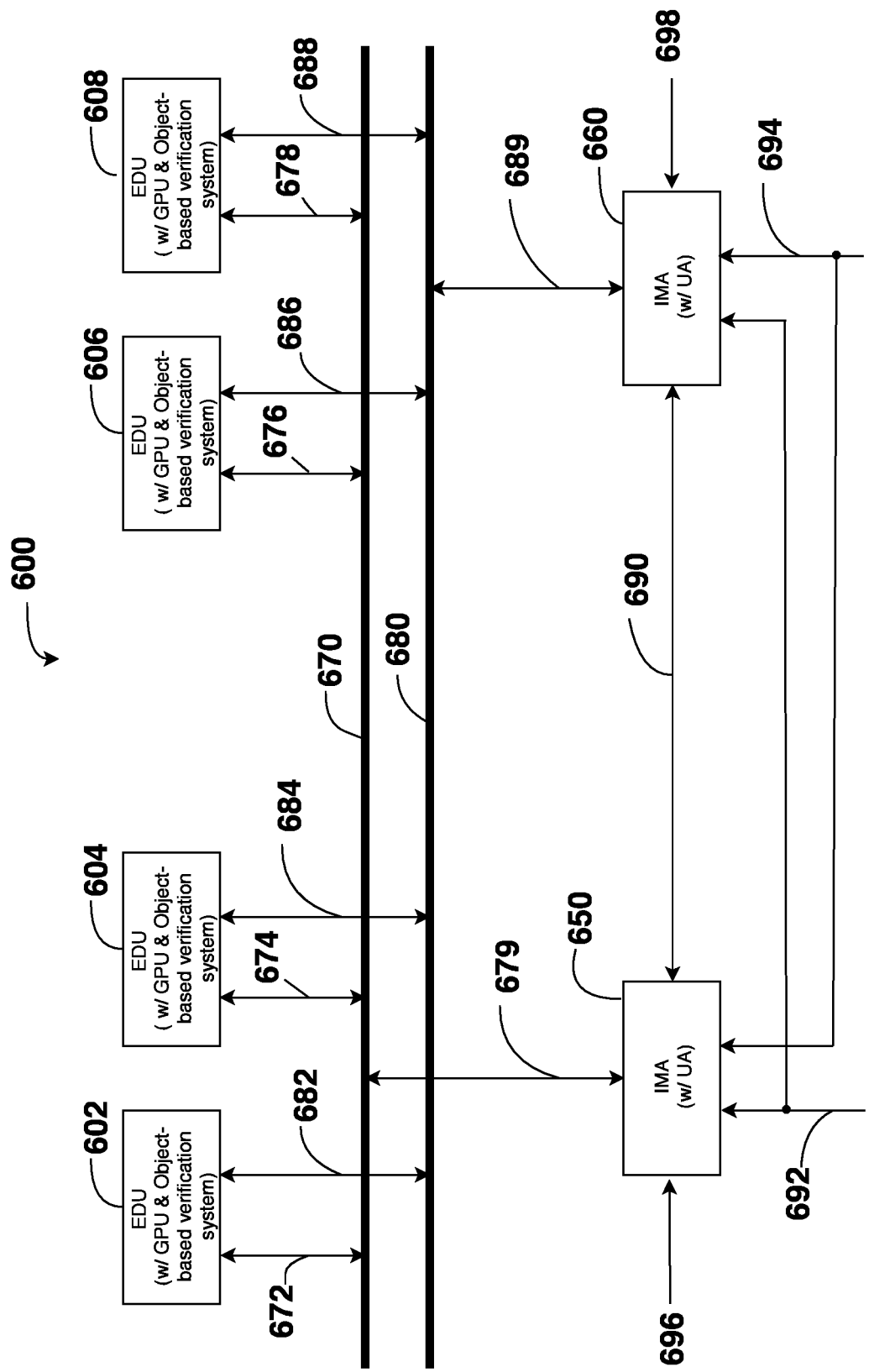
FIG. 8 depicts the block diagram of a first embodiment of the redundant cockpit display system of the present invention.

FIG. 8 shows a first redundant system embodiment of the present invention with the GPU function block integrated in the display unit. Cockpit display system 600 comprises four substantially identical Electronics Display Units (EDU) 602, 604, 606 and 608. Each EDU has a built-in GPU and an object-based verification system of the present invention as depicted in FIG. 6. EDUs 602 and 604 are used by the pilot; while EDUs 606 and 608 are used by the co-pilot. Under the normal operating condition, EDUs 602 and 608 are used for PFD functions; while EDUs 604 and 606 are used for navigation and MFD functions. Since all of these four EDUs are substantially identical, EDUs 604 and 606 can be used for PFD functions if EDUs 602 and 608 become unavailable.

For redundant purpose, cockpit display system 600 comprises two independent IMA computers 650 and 660, and two independent command/data buses 670 and 680. Command/data links 672, 674, 676, 678, and 679 connect four EDUs 602, 604, 606, 608 and IMA computer 650 to the command/data bus 670, respectively. Command/data links 682, 684, 686, 688 and 689 connect four EDUs 602, 604, 606, 608 and IMA computer 660 to the command/data bus 680, respectively. Command/data buses 670 and 680 are implemented using protocol selected from a group comprising ARINC429, ARINC 629, ARINC664, MIL-STD-1553 or other suitable protocols. Each of IMA computers 650 and 660 has two independent sensor input sources 692 and 694. Each of independent sensor input sources 692 and 694 comprises a group of sensor inputs selected from a group comprising airspeed, altitude, air temperature, vertical speed, angle of attack, barometric pressure, turn coordinator, heading indicator, attitude indicator, navigation, engine data and other aircraft information. Each sensor input source also includes double or triple redundant sensors. Each IMA computer selects one sensor source as its default input source. An IMA computer communication link 690 is connected between IMA computers 650 and 660 for data sharing and health checking. Communication link 690 is implemented using ARINC664 or other suitable communication protocol. Two independent redundant power supplies 696 and 698 are used to provide power to IMA computers 650 and 660, respectively.

Each of IMA computers 650 and 660 hosts a User Application (UA) software, which generates graphic commands for each EDU based on the selected sensor input source. The UA software is implemented using an ARINC 661 or other suitable protocol.

This redundant cockpit display system embodiment 600 is designed to tolerate a single point failure. For example, if sensor input source 692 fails, IMA computer 650 will obtain the required sensor information from sensor source 694. If IMA computer 650 or associated command/data link 679 fails, all four EDUs 602, 604, 606 and 608 will be driven by IMA computer 660 through command/data bus 680. If EDU 602 fails, the PFD screen will be displayed on the nearby EDU 604 through a reversionary scheme.

Figure 9:
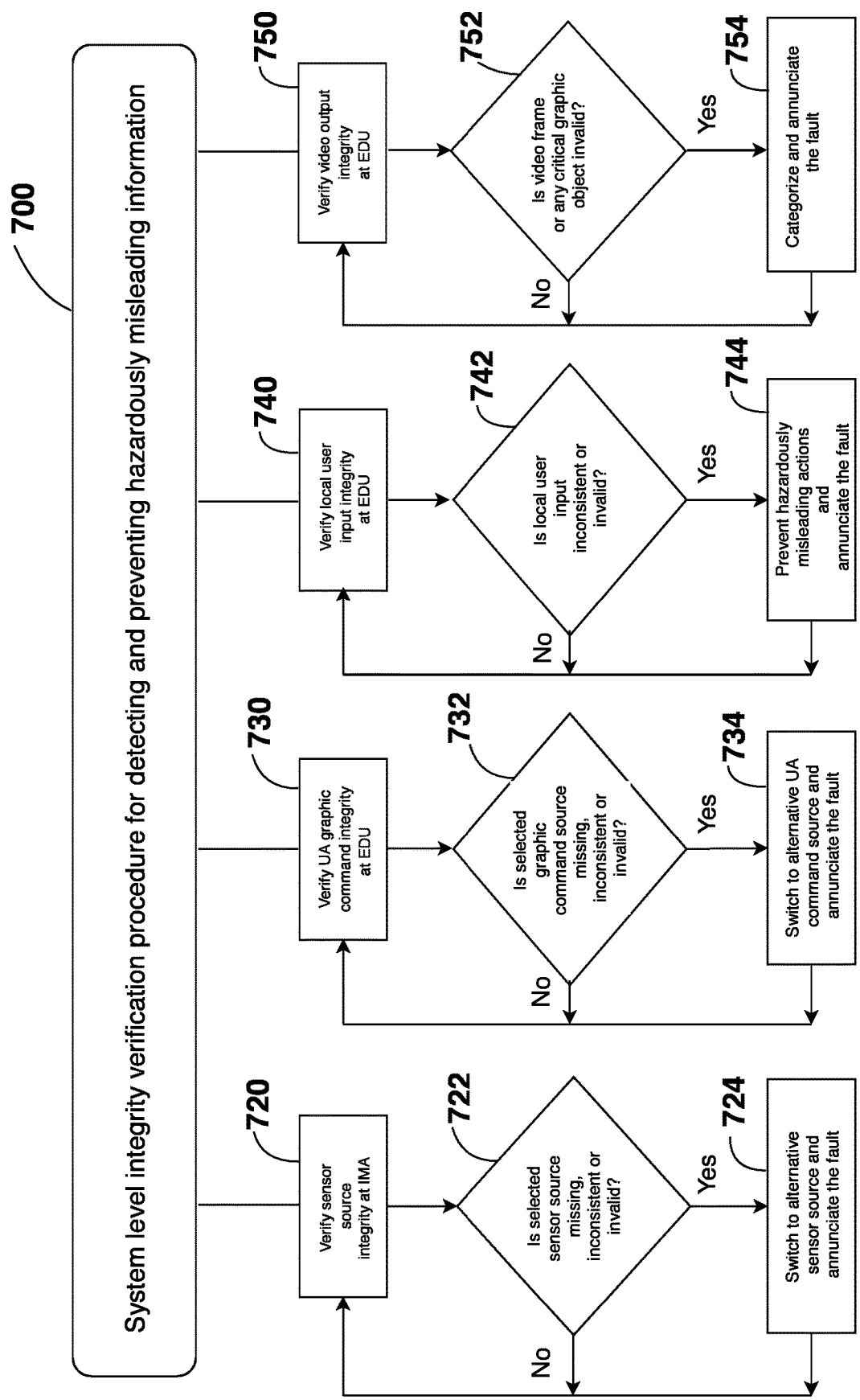
FIG. 9 depicts the flowchart of an exemplary system level integrity verification procedure of the present invention.

This redundant cockpit display system embodiment 600 is also designed to detect and prevent hazardously misleading information being displayed on the EDU. FIG. 9 shows the flowchart of an exemplary system level integrity verification procedure of the present invention for cockpit display system 600.

The exemplary system level integrity verification procedure 700 for detecting and preventing hazardously misleading information is a systematic approach and is implemented at both IMA computers and EDU ends.

The integrity of the sensor input source is verified in IMA computers 650 and 660, as shown in step 720. This includes verifying sensor data range, staleness and consistency between sensors of the same type. Majority voting method can also be utilized for a triple redundant sensor system. If sensor data missing, inconsistent or invalid condition is detected, as indicated in step 722, the IMA computer will switch to an alternative sensor source and annunciate this fault condition accordingly, as indicated in step 724.

Inside each EDU, the integrity verification procedure comprises three related processes. Graphic commands received from both IMA computers 650 and 660 are evaluated and compared, as shown in step 730. If a selected graphic command source is missing, inconsistent or invalid, as indicated in step 732, the EDU will switch to an alternative command source, and annunciate the fault condition, as indicated in step 734. EDU also verifies the integrity of the local user inputs from keypad and touch screen if applicable, as indicated in step 740. EDU monitors the local user input to detect inconsistent (such as excessive jittering) or invalid (such as prolonged switch bouncing) input as indicated in step 742. If a fault is detected, EDU will prevent any action which may create hazardously misleading actions (such as rapidly changing highlighted switch selection) and report the fault to the UA software, as indicated in step 744.

After validating the graphic command and local input, the EDU renders the screen display. The object-based verification process of the present invention is used to verify the integrity of the video output, as indicated in step 750. EDU monitors the video output for fault condition, such as freezing frame or incorrect safety-critical graphic object, as indicated in step 752. The detected fault condition is categorized based on the criticality of the graphic object, the severity and the duration of the fault to determine the proper alarm level, such as warning, caution and advisory, as indicated in step 754. This is to capture real hazardously misleading information without false, unnecessary and annoying alarms. Refer to FIGS. 5 and 6 for more detailed description about the object-based verification process of the present invention.

Figure 10:
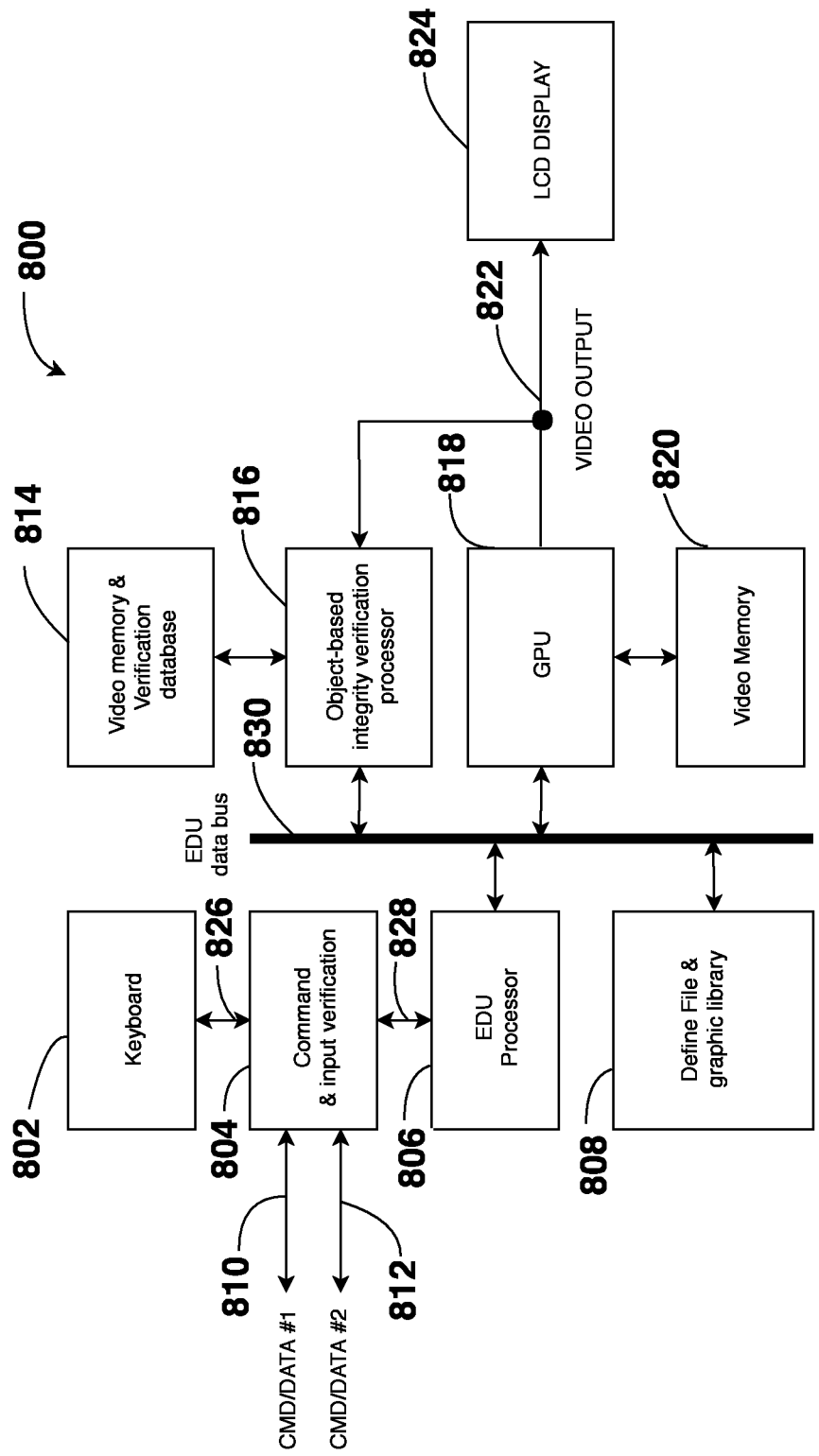
FIG. 10 depicts the block diagram of an EDU embodiment with integrated GPU and object-based integrity verification system of the present invention.

FIG. 10 shows the block diagram of an embodiment of the Electronics Display Units (EDU) 800, which is a detailed presentation of EDUs 602, 604, 606 and 608 shown in FIG. 8. EDU 800 comprises two command/data ports 810 and 812. Command/data port #1, 810, is connected to command data bus 670 and driven by IMA computer 650, as shown in FIG. 8. Command/data port #2, 812, is connected to command data bus 680 and driven by IMA computer 660. As shown in FIG. 8, each of IMA computers 650 and 660 hosts an ARINC 661 User Application (UA) software. This UA software sends graphic commands to the EDU based on the ARINC 661 protocol, and manages the pilot inputs received at the EDU keyboard.

As shown in FIG. 10, graphic commands received from ports 810 and 812 are verified by a command and input verification function block 804 to detect any missing, inconsistent or invalid graphic command. Function block 804 is also shown as step 732 in FIG. 9. The command and input verification function block 804 also verifies the keyboard input 826 received from keyboard 802 to detect any inconsistent or invalid keyboard input. This function is also shown as step 742 of FIG. 9. Valid keyboard input event is forwarded to the responsible UA for processing.

As shown in FIG. 10, the command and input verification function block 804 delivers the verified command and keyboard input 828 to an EDU processor 806. An EDU data bus 830 is used to connect the system components together.

If the cockpit display system is designed according to the ARINC 661 protocol, the EDU processor 806 configures the display screen based on a Graphic User Interface (GUI) screen Definition File (DF) and a graphic library stored in system memory 808. Based on the DF file, the EDU processor 806 generates a verification database, and sends it to the object-based integrity verification processor 816. The verification database is, then, stored in the verification memory 814.

During the run time, EDU processor 806 sends GPU 818 graphic drawing commands to render the display output in the video memory 820 based on the verified command and keyboard input 828. The EDU processor 806 also sends the graphic drawing commands to the object-based integrity verification processor 816 to render the required reference image, such as reference ID code image 425, as shown in FIG. 6. The video output image 822 is sent to the LCD panel 824 for display. The video output 822 is also looped back to the object-based integrity verification processor 816. The object-based integrity verification processor 816 verifies the video output 822 using the verification process depicted in FIG. 5 and the verification database stored in verification memory 814 to detect any invalid video frame or failed safety-critical graphic object. This process is also shown as step 752 of FIG. 9.

Figure 11:
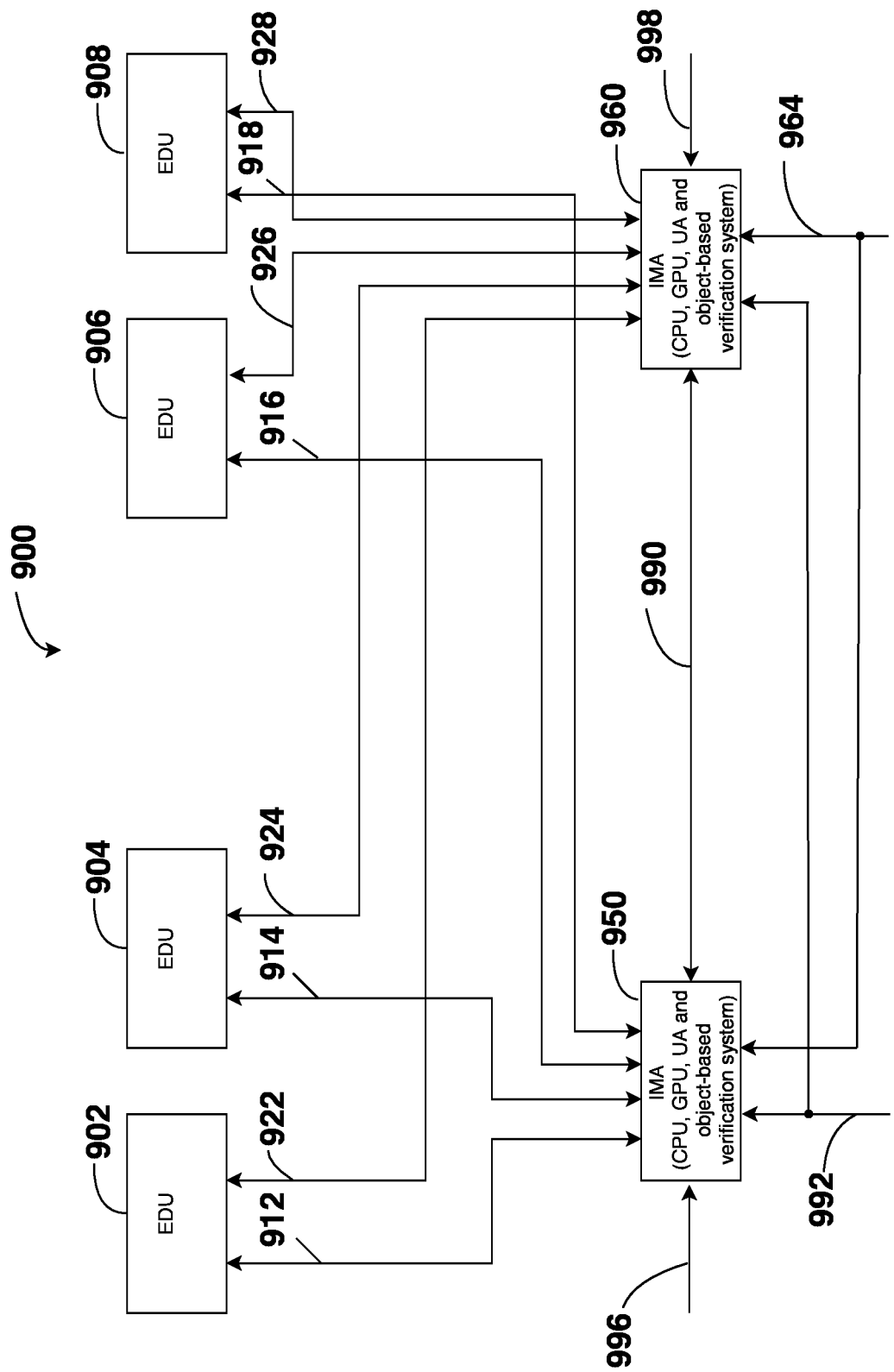
FIG. 11 depicts the block diagram of a second embodiment of the redundant cockpit display system of the present invention.

FIG. 11 shows a second redundant system embodiment of the present invention with the GPU function block integrated in the IMA computer. Cockpit display system 900 comprises four substantially identical Electronics Display Units (EDU) 902, 904, 906 and 908, and two independent Integrated Modular Avionics (IMA) computers 950, and 960. Each of the IMA computers 950 and 960, comprises a plurality of CPUs, GPUs, User Application (UA) software and object-based integrity verification systems of the present invention. Each of the IMA computers 950 and 960 has two independent sensor input sources 992 and 994. Each of input sources 992 and 994 comprises a group of sensor inputs selected from a group comprising airspeed, altitude, air temperature, vertical speed, angle of attack, barometric pressure, turn coordinator, heading indicator, attitude indicator, navigation, engine data and other aircraft information. Each sensor input source also includes double or triple redundant sensors. Each IMA computer selects one sensor source as its default input source. A communication link 990 is connected between IMA computers 950 and 960 for data sharing and health checking. Communication link 990 is implemented using ARINC664 or other suitable communication protocol. Two independent redundant power supplies 996 and 998 are used to provide power to IMA computers 950 and 960, respectively.

Each of the two IMA computers 950 and 960 has a plurality of video/communication links. Video/communication links 912, 914, 916 and 918 connect IMA computer 950 to EDU 902, 904, 906 and 908, respectively. Video/communication links 922, 924, 926 and 928 connect IMA computer 960 to EDU 902, 904, 906 and 908, respectively. Each of these video/communication link comprises a unidirectional video channel and a bidirectional communication channel. The unidirectional video channel transmits the display image from an IMA computer to an EDU, and is implemented using an ARINC818 optical fiber, a DVI shield twisted pair cable, a 3G H D SDI coaxial cable, or any other suitable protocol. The display image embedded error detection methods, such as sequential frame counter and CRC code for transmission integrity verification. The bidirectional communication channel sends commands from an IMA computer to an EDU and returns pilot's inputs and display status from an EDU back to an IMA computer.

This redundant cockpit display system embodiment 900 is designed to tolerate single point failure. For example, if sensor input source 992 fails, IMA computer 950 will obtain the required sensor information from sensor source 994. If IMA computer 950 fails, all four EDUs 902, 904, 906 and 908 will be driven by IMA computer 960. Under normal operating condition, EDUs 902 and 908 are used for PFD functions; while EDUs 904 and 906 are used for navigation and MFD functions. Since all these four EDUs are substantially identical, EDUs 904 and 906 can be used for PFD functions through a reversionary scheme if EDUs 902 and 908 become unavailable.

Figure 12:
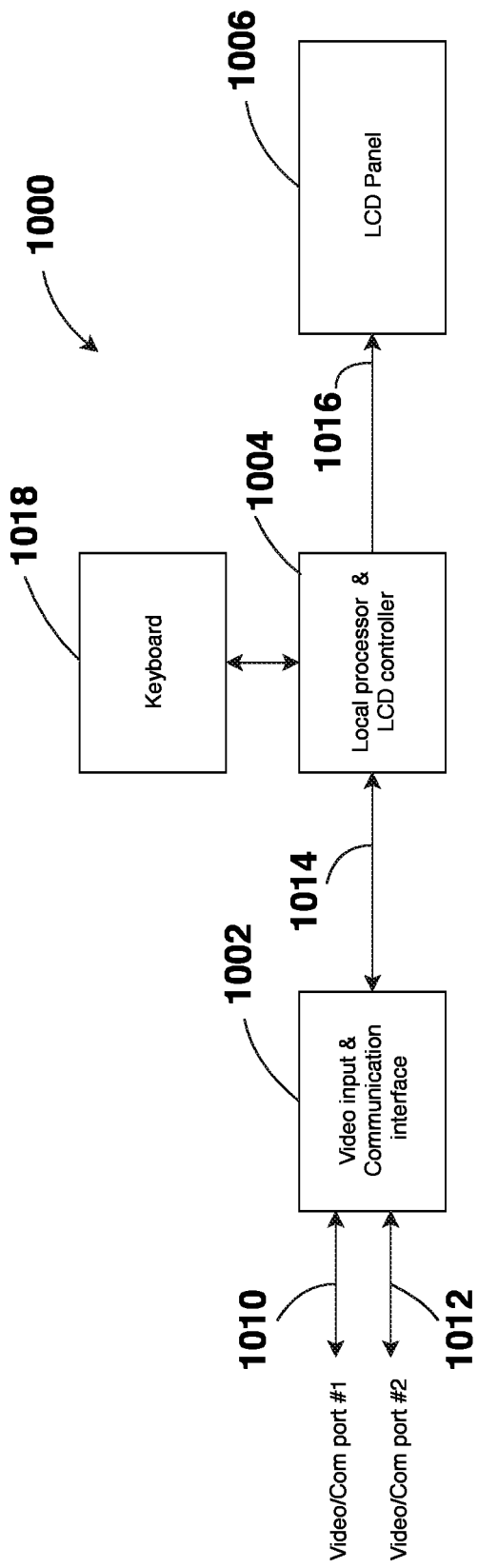
FIG. 12 depicts the block diagram of an exemplary EDU in the second embodiment of the cockpit system of the present invention.

FIG. 12 shows the block diagram of an exemplary EDU in display system 900. EDU 1000 comprises a local processor and LCD controller function block 1004, a keyboard function block 1018, a LCD panel function block 1006 and a video input and communication interface function block 1002. The video input and communication interface 1002 has two video/Com ports 1010, and 1012. Each of these two ports comprises a unidirectional video input link and a bidirectional communication link. Each port is connected to one IMA computer, as shown in FIG. 11.

The local processor in function block 1004 select one of the ports as its primary input and output. The video input section of the function block 1002 provides signal conversion from fiber to copper if it is applicable and sends the digital video signal to function block 1004 through data link 1014. The local processor in function block 1004 verifies the signal integrity of the primary video input signal using the embedded sequential frame counter and CRC code. If the primary video input is missing or invalid, the second video input channel will be activated, and the pilot will be alerted. The verified video input is then passed to the LCD controller in function block 1004, where the video signal is formatted for displaying on the LCD panel 1006. Formatted video and LCD timing signals are sent to LCD panel 1006 through a video link 1016.

The local processor in function block 1004 reads and de-bounces the switch inputs and updates the indicator outputs for keyboard 1018. The local processor in function block 1004 also manages the local built-in-test (BIT) to monitor the status of the EDU 1000. Keyboard input and EDU status are reported back to the associated IMA computer.

Although aircraft, PFD, attitude indicator, IMA computer, ARINC 661 protocol and Zynq FPGA have been described in the preferred embodiments, it should be understood that these are only examples and not limitations. The foregoing detailed description has been given for clearness of understanding only, and no unnecessary limitations should be understood therefrom, as modifications will be obvious to those skilled in the art. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A redundant display system for achieving required safety objectives, comprising:
   a plurality of computers interconnected by a communication network for data sharing and health checking, each of said computers receiving a plurality of sensor inputs and hosting a user application software for generating graphic commands based on said sensor inputs;
   a plurality of graphics processing units (GPU), each of said graphics processing units receiving said graphic commands from at least one of said computers for rendering at least one video output;
   a plurality of display units for displaying said video output rendered by at least one of said graphics processing units;
   a plurality of command links for transmitting said graphic commands from said computers to said graphics processing units;
   a plurality of video links for transmitting video outputs from said graphics processing units to said display units; and
   a plurality of object-based integrity verification systems to verify if each of said plurality of graphics processing units correctly renders said at least one video output according to said graphic commands received from at least one of said computers, each said object-based integrity verification system comprising an object-based integrity verification processor for identifying a plurality of safety-critical graphic objects contained in one of said at least one video output to be verified, assigning a numerical object ID code to each of said safety-critical graphic objects, storing verification information related to each of said safety-critical graphic objects in a page-based histogram database using said numerical object ID code as a page index, monitoring shape, pixel location and color attributes of each of said safety-critical graphic objects to be depicted on one of said plurality of display units, tracking visibility and overlay properties between said safety-critical graphic objects, detecting and analyzing GPU failures from said safety-critical graphic objects, and annunciating said detected GPU failures.

2. The redundant display system of claim 1, wherein each of said object-based integrity verification systems further comprises:
   a communication link for said object-based integrity verification processor to exchange command and data with a host processor;
   a video input link for receiving a video input looped back from said video output to be verified;
   a video pre-processor for performing at least one function selected from a group comprising image buffering, Cyclic Redundancy Check (CRC) code checking and color space converting on said video input to generate a pre-processed video input;
   a memory device for image buffering and database hosting; and
   a pixel counting histogram processor coupled with said object-based integrity verification processor for analyzing color information for each of said safety-critical graphic objects contained in said pre-processed video input.

3. The redundant display system of claim 1, wherein said object-based integrity verification processor is implemented by a Complex Electronic Hardware (CEH) device selected from a group comprising a Field Programmable Gate Array (FPGA), a FPGA with integrated Central Processing Unit (CPU), and a FPGA with integrated CPU and Graphics Processing Unit.

4. The redundant display system of claim 1, wherein said object-based integrity verification processor generates a monochrome reference ID code image for monitoring and tracking said safety-critical graphic objects.

5. The redundant display system of claim 1, wherein said graphics processing units and said object-based integrity verification systems are installed together in devices selected from a group comprising said computers and said display units.

6. The redundant display system of claim 1, wherein said object-based integrity verification processor verifies integrity of each of said safety-critical graphic objects based on verification information stored in said page-based histogram database.

7. The redundant display system of claim 1, wherein said object-based integrity verification processor renders a monochrome reference ID code image using said numerical object ID code as a color component for tracking each safety-critical graphic object and a lower-layer-object-first drawing sequence for preserving the same visibility priority as in said video output.

8. An object-based integrity verification method for detecting hazardously misleading information contained in a sequence of video frames generated by a graphics processing unit (GPU) to achieve required safety objectives, said object-based integrity verification method comprising steps of:
   identifying a plurality of safety-critical graphic objects contained in a video frame to be verified selected from said sequence of video frames generated by said graphics processing unit based on said required safety objectives;
   verifying pixel location, shape and color information of each of said safety-critical graphic objects, and overlaying property between said safety-critical graphic objects in said video frame to be verified using a pixel counting histogram processor to detect GPU failure condition and pinpoint safety-critical graphic object failure;
   evaluating said GPU failure condition; and
   annunciating said GPU failure condition with proper warning level selected from a group comprising warning, alarm, caution and advisory.

9. The method of claim 8, wherein said step of verifying further comprises processing steps of:
   scanning said video frame to be verified to obtain an input image;
   pre-processing said input image to perform at least one function selected from a group comprising image buffering, Cyclic Redundancy Check (CRC) code checking and color space converting to generate a pre-processed input image;
   locating each of said safety-critical graphic objects in said pre-processed input image; and
   verifying color, shape and pixel location information of each of said safety-critical graphic objects in said pre-processed input image to detect said GPU failure condition.

10. The method of claim 9, wherein said step of locating is implemented using image processing and pattern recognition methods.

11. The method of claim 8, wherein said step of verifying utilizes different failure detection thresholds for different graphic objects based on the criticality and characteristics of said safety-critical graphic objects.

12. The method of claim 8, wherein said step of evaluating categorizes said GPU condition based on the criticality of said safety-critical graphic object failure, severity and duration of said GPU failure condition, a circumstance under which said GPU failure condition is detected, and a set of fault handling rules.

13. The method of claim 8, wherein said step of annunciating provides appropriate corrective actions.

14. The method of claim 8 further comprising a step for ensuring that a probability of displaying hazardously misleading information due to failure of said step of verifying also meets said required safety objectives.

15. The method of claim 8, wherein said step of identifying step further comprises:
   a first step of selecting at least one verification zone containing all of said plurality of safety-critical graphic objects in said video frame to be verified;
   a second step of assigning each of said safety-critical graphic objects a numerical object identification code; and
   a third step of creating an object verification database for said video frame to be verified.

16. The method of claim 15, wherein said object identification code is assigned based on a Z-dimension from a distant image background to said safety-critical graphic object for resolving visibility and overlay properties between said plurality of safety-critical graphic objects.

17. The method of claim 15, wherein said object verification database comprises a plurality of parameters selected from a group comprising a sequential video frame ID number; look-up tables for mapping each of said object identification code to related ARINC 661 window number, layer ID and widget ID; X-Y coordinates of said verification zone; number of pixels in each said safety-critical graphic object; geometric boundary, color, color tolerance, vertex X-Y coordinates, text content and rotating angle of each of said safety-critical graphic objects; and rules for fault handling.

18. The method of claim 15, wherein said step of verifying further comprises steps of:
rendering a monochrome reference ID code image using said object identification code as a color component for tracking said safety-critical graphic objects, and a lower-layer-object-first drawing sequence for reserving the same visibility priority as in said video frame to be verified;
scanning said video frame to be verified and said monochrome reference ID code image;
sorting pixel values obtained from said video frame to be verified based on object identification code obtained at the same pixel location of said monochrome reference ID code image; and
processing said sorted pixel values using said pixel counting histogram processor and saving results in a page-based histogram database indexed by said object identification code.

19. The method of claim 15, wherein said step of identifying further comprises steps of:
rendering a color reference image to reproduce said video frame to be verified selected from said sequence of video frames generated by said GPU;
rendering a monochrome reference ID code image using said numerical object identification code as a color component and a lower-layer-object-first drawing sequence for reserving the same visibility priority as in said video frame to be verified;
scanning said video frame to be verified, said color reference image and said monochrome reference ID code image;
comparing said color reference image with corresponding image of said video frame to be verified on a pixel-by-pixel basis to generate a difference image;
sorting pixel values of said difference image based on the object identification code obtained at the same pixel location of said monochrome reference ID code image; and
processing said sorted pixel values of said difference image using said pixel counting histogram processor and saving the results in a page-based histogram database indexed by said object identification code.

20. A safety-critical display system, comprising:
at least one central processing unit;
at least one graphics processing unit receiving graphic commands from said at least one central processing unit to render at least one video output signal, each of said at least one video output signal containing a plurality of safety-critical graphic objects;
at least one video output device for displaying said video output signal;
at least one video pre-processor for performing at least one function selected from a group comprising image buffering, Cyclic Redundancy Check (CRC) code checking and color space converting on each of said at least one video output signal rendered by said at least one graphics processing unit;
an object-based integrity verification process to verify if each of said at least one graphics processing unit correctly renders said plurality of safety-critical graphic objects contained in said at least one video output signal according to said graphic commands received from said at least one central processing unit, said object-based integrity verification process comprising steps of:
assigning each of said safety-critical graphic objects a numerical object ID code;
generating a monochrome reference ID code image using said numerical object ID code as a color component for each of said safety-critical graphic objects and a lower-layer-object-first drawing sequence based on a Z-dimension of each of said plurality of safety-critical graphic objects;
monitoring shape, pixel location and color attributes of each of said safety-critical graphic objects using said monochrome reference ID code image and a pixel counting histogram processor to detect failure conditions generated by said graphics processing unit from said safety-critical graphic objects; and
evaluating said detected failure conditions generated by said graphics processing unit and generating alarms with proper warning level.

* * * * *